(12) United States Patent
Moroto et al.

(10) Patent No.: US 7,084,547 B2
(45) Date of Patent: Aug. 1, 2006

(54) MOTOR, FUEL PUMP, COMMUTATOR, AND METHOD FOR MANUFACTURING A COMMUTATOR

(75) Inventors: Kiyonori Moroto, Kariya (JP); Motoya Ito, Hekinan (JP); Kenzo Kiyos, Takahama (JP); Eiji Iwanari, Chiryu (JP); Masayuki Kobayashi, Kasugai (JP)

(73) Assignee: Denso Corporation (JP)

( * ) Notice: Subject to any disclaimer, the term of this patent is extended or adjusted under 35 U.S.C. 154(b) by 35 days.

(21) Appl. No.: 10/761,465

(22) Filed: Jan. 22, 2004

(65) Prior Publication Data

US 2004/0150280 A1   Aug. 5, 2004

(30) Foreign Application Priority Data

| Jan. 22, 2003 | (JP) | ............................. 2003-013460 |
| Apr. 3, 2003 | (JP) | ............................. 2003-100050 |
| Apr. 8, 2003 | (JP) | ............................. 2003-103847 |
| Sep. 18, 2003 | (JP) | ............................. 2003-326344 |

(51) Int. Cl.
*H02K 13/00* (2006.01)

(52) U.S. Cl. .......................... 310/233; 310/220; 310/72

(58) Field of Classification Search .................. 310/72, 310/195–208, 127–151, 219–237
See application file for complete search history.

(56) References Cited

U.S. PATENT DOCUMENTS

| 3,322,988 A * | 5/1967 | Ishikawa et al. ............. 310/220 |
| 3,594,598 A * | 7/1971 | Schaub ........................ 310/220 |
| 4,566,866 A * | 1/1986 | Kemmner .................... 417/366 |
| 4,701,655 A * | 10/1987 | Schmider .................... 310/237 |
| 5,157,294 A * | 10/1992 | Matsushita ................... 310/72 |
| 5,216,306 A * | 6/1993 | Nakazawa et al. ............ 310/89 |
| 5,266,860 A * | 11/1993 | Chiba et al. ................. 310/233 |
| 5,296,771 A * | 3/1994 | Sakuma et al. ............. 310/220 |
| 5,498,919 A * | 3/1996 | Bahn .......................... 310/268 |
| 5,614,775 A * | 3/1997 | Horski et al. ............. 310/68 R |
| 5,717,270 A * | 2/1998 | Lau et al. .................... 310/220 |
| 6,057,623 A | 5/2000 | Tanaka et al. ............. 310/206 |
| 6,127,759 A | 10/2000 | Tanaka et al. ............. 310/233 |
| 6,181,046 B1 | 1/2001 | Daikoku et al. ............ 310/236 |
| 6,236,137 B1 | 5/2001 | Tanaka et al. ............. 310/233 |
| 6,285,106 B1 * | 9/2001 | Oki ............................. 310/233 |
| 6,388,354 B1 | 5/2002 | Tanaka et al. ............. 310/179 |
| 6,880,229 B1 * | 4/2005 | Zepp et al. ................... 29/596 |
| 2005/0073214 A1* | 4/2005 | Potocnik et al. ............ 310/236 |
| 2005/0200230 A1* | 9/2005 | Breynaert et al. .......... 310/222 |

FOREIGN PATENT DOCUMENTS

| DE | 43 38 345 A1 * | 5/1995 |
| JP | B2-7-85642 | 7/1994 |

* cited by examiner

*Primary Examiner*—Dang Le
(74) *Attorney, Agent, or Firm*—Nixon & Vanderhye PC

(57) ABSTRACT

A commutator includes six segments disposed in the direction of rotation, and is attached to one axial end of an armature. By the commutator rotating together with the armature, each of the segments successively contacts a brush. Each of the segments is electrically connected with terminals through mid-terminals. Three of the six terminals, non-adjacent and alternatingly located in the direction of rotation, are electrically connected directly with mid-terminals facing in radial opposition. Capacitors are electrically connected directly with the terminals adjacent in the direction of rotation. Discharge does not occur between the brush and segments when the brush separates from the segments accompanying rotation of the armature, since electromagnetic energy built up in the coils of the armature is temporarily built up in the capacitors.

17 Claims, 26 Drawing Sheets

MOTOR, FUEL PUMP, COMMUTATOR, AND METHOD FOR MANUFACTURING A COMMUTATOR

CROSS REFERENCE TO RELATED APPLICATIONS

This application is based upon, claims the benefit of priority of, and incorporates by reference Japanese Patent Application No. 2003-13460 filed Jan. 22, 2003, No. 2003-100050 filed Apr. 3, 2003, No. 2003-103847 filed Apr. 8, 2003, and No. 2003-326344 filed Sep. 18, 2003.

BACKGROUND OF THE INVENTION

1. Field of the Invention

The present invention relates to a motor, a fuel pump, a commutator, and a method for manufacturing a commutator.

2. Description of the Related Art

Motors are known that use a commutator having a plurality of segments disposed in a circular fashion in the direction of rotation and that are electrically connected with coils wound around an armature, such that drive current supplied to the armature is converted by brushes that successively contact the segments accompanying rotation of the armature. Japanese Patent Publication No. Hei 7-85642 discloses such a motor.

In this sort of motor, there are sometimes occurrences of discharge between a brush and the segments when the segments separate from the brush accompanying rotation of the armature due to electromagnetic energy built up in the coils being released. When discharge occurs between the brush and the segments, there is the possibility of the brush and the segments suffering discharge wear, leading to poor electrical contact between the brush and the segments. It is another object of the present invention to provide a motor, a fuel pump, a commutator, and a method for manufacturing a commutator, which is capable of preventing discharge wear of the brush and the segments thereof.

Many motors have a plurality of segments disposed in the direction of rotation and are electrically connected to coils wound around an armature, and convert drive current which is supplied to the armature by brushes that successively contact each segment accompanying rotation of the armature. Among such motors, there are known configurations wherein segments of the same potential are electrically connected together.

For example, according to Japanese Patent Laid-Open Publications No. 2000-166185, No. 2000-60073, No. 2000-60074, and No. 2000-224822, a plurality of connection terminals are layered in the axial direction alternately with insulation plates interposed therebetween, with equalizers disposed at each connection terminal so as to extend in the radial direction to the opposite side. Per each connection terminal, equalizers disposed at differing positions in the direction of rotation are bent toward the segments, and segments of the same potential are electrically connected together by the equalizers.

According to Japanese Patent Laid-Open Publication No. 2000-60077, mutually insulated printed wiring boards are layered in the axial direction, and connecting plates are formed on each printed wiring board at differing positions in the direction of rotation per each printed wiring board. Protrusions projecting from segments of the same potential pass through the printed wiring boards to electrically connect to connecting plates of the printed wiring boards in corresponding layered positions.

However, with the aforementioned examples disclosed in the patent publications, since connection terminals or printed wiring boards are layered in the axial direction with insulation plates or insulation boards interposed therebetween to connect segments of the same potential, the axial length of connectors for electrically connecting segments of the same potential is long. Accordingly, the axial length of the motor is adversely long.

SUMMARY OF THE INVENTION

In view of the forgoing, it is therefore an object of the present invention to provide a motor in which an increase in axial length thereof is controlled with respect to electrically connecting segments of the same potential. It is another object of the present invention to provide a motor, a fuel pump, a commutator, and a method for manufacturing a commutator, which is capable of preventing discharge wear of the brush and the segments thereof.

To achieve the above, a motor utilizes a permanent magnet formed from a plurality of magnetically differing poles disposed in an alternating and circumferential fashion, an armature that rotates and that is disposed within an inner circumference of the permanent magnet, the armature having coils, and a commutator having a plurality of segments disposed about the path of rotation and electrically connected to the coils wound around the armature, the segments being mutually adjacent in the direction of rotation and being mutually insulated. Furthermore, a brush successively contacts each of the segments due to rotation of the armature and a capacitor is electrically connected to a circuit that includes the commutator and the armature. The capacitor stores electromagnetic energy released by the coils during rotation of the armature to prevent occurrence of discharge between the brush and the segments.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

First Embodiment

Figure 2:
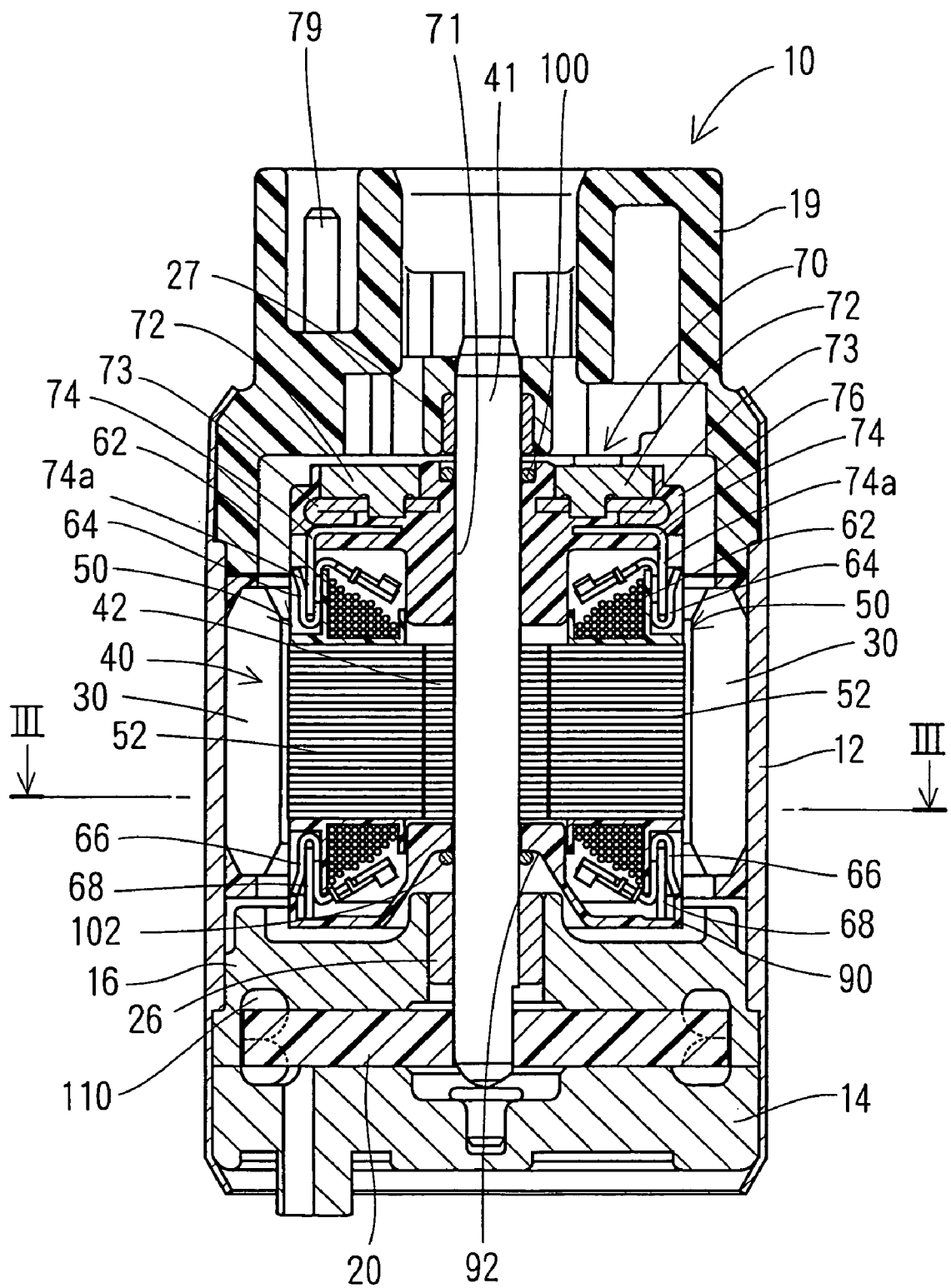
FIG. 2 is a cross-sectional view of a fuel pump according to the first embodiment.

Referring to FIG. 2, a fuel pump 10 is an in-tank style pump installed, for example, in a vehicle fuel tank. The fuel pump 10 has a housing 12, and an inlet cover 14 and an outlet cover 19 that are secured in place by the housing 12 by means of calking or sealing.

A pump casing 16 is held between the inlet cover 14 and the housing 12. A C-shaped fluid channel 110 for the pump is formed between the inlet cover 14 and the pump casing 16. The inlet cover 14 and the pump casing 16 are case members in which an impeller 20 is rotatably contained as a rotating member. The inlet cover 14, the pump casing 16, and the impeller 20 constitute a pump portion. The pump casing 16 is the member of the case members containing the impeller 20 which is nearest an armature 40. The pump casing 16 supports a first axle bearing 26 on an inner circumference thereof.

Several vane grooves are formed on the outer circumferential edge of the disk-shaped impeller 20. When the impeller 20 rotates together with a shaft 41 due to rotation of the armature 40, a pressure differential occurs due to fluid friction before and after the vane grooves of the impeller 20 and by repetition thereof by the several vane grooves causing fuel inside the fluid channel 110 to become pressurized. Fuel in the fuel tank is first drawn by the rotation of the impeller 20 into the fluid channel 110 from a fuel inlet (not shown) formed in the inlet cover 14, and is eventually discharged from a connecting passage (not shown) of the pump casing 16 near a cover 90 disposed at one axial end of the armature 40. The fuel continues by passing along an outer circumference of the armature 40 toward a commutator 70, and finally passes through a fuel outlet (not shown) to be output from the fuel pump 10 onward toward an engine (not shown).

A permanent magnet 30 formed in four arc-shaped pieces, each piece being a quarter of an arc, is attached circumferentially to an inner circumference of the housing 12. The permanent magnet 30 is formed into four pieces having magnetic poles of differing polarity following in the direction of rotation.

At the other axial end of the armature 40 opposite to the cover 90 the commutator 70 is attached, and the axial end of the armature 40 opposite to the commutator 70 is covered by the cover 90. The shaft 41, acting as the rotational axis of the armature 40, is rotatably supported by the first axle bearing 26 and a second axle bearing 27 which are contained and supported, respectively, by the pump casing 16 and the outlet cover 19.

Figure 3:
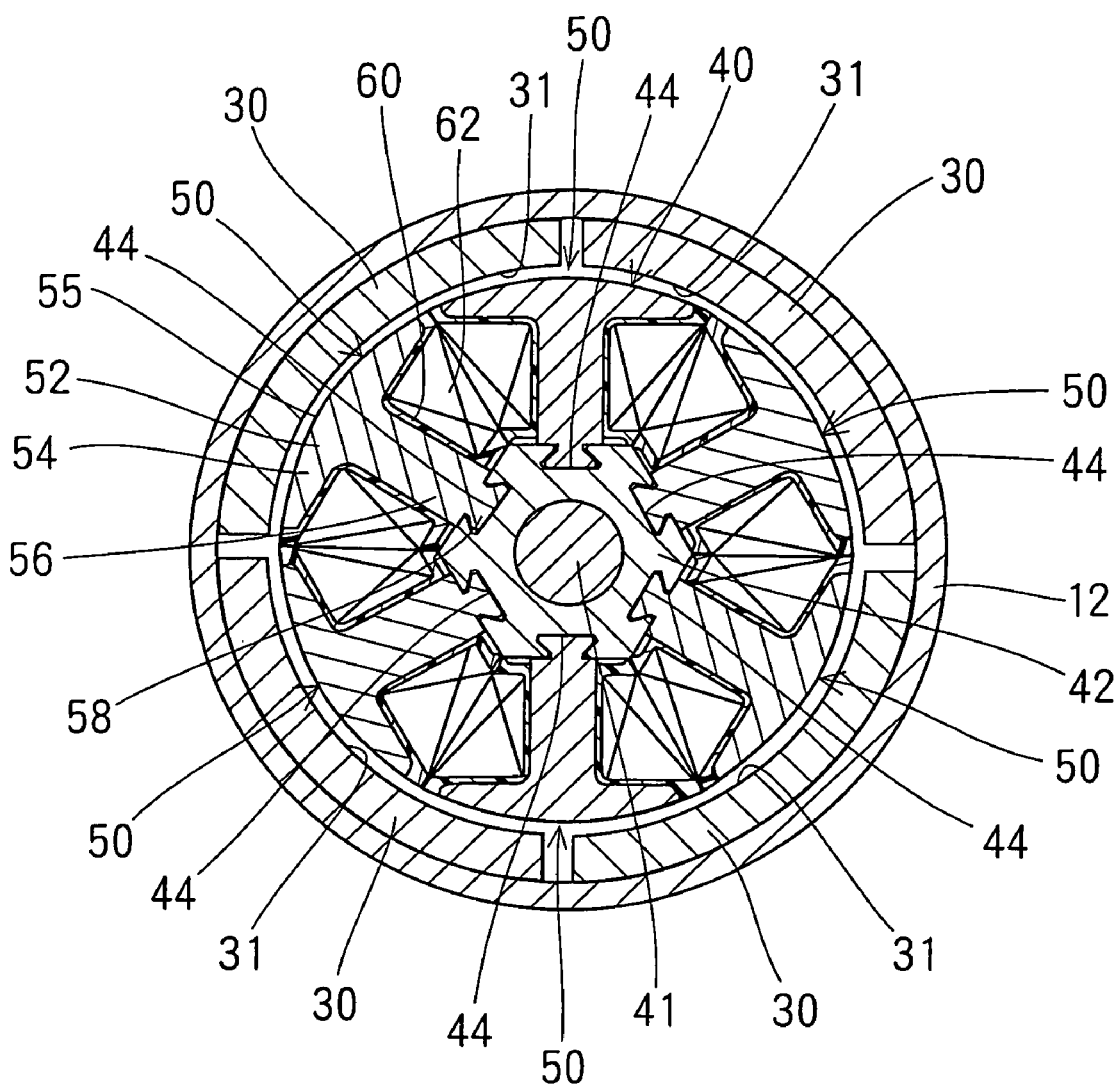
FIG. 3 is a cross-sectional view taken along the line III—III of FIG. 2.

As shown in FIG. 3, the armature 40 has a center core 42 in its central rotating portion. The shaft 41 is press fitted into the center core 42. The center core 42 is formed in a tubular, hexagon-shaped cross-section, and comprises depressed portions 44 extending axially at the six outer circumferential faces of the center core 42. The width of the depressed portions 44 gradually decreases in the radial direction the shorter the distance becomes to the outer circumferential faces of the center core 42.

Six coiled pole portions 50 are disposed in the direction of rotation on the outer circumference of center core 42. Each of coiled pole portions 50 has coil cores 52, bobbins 60, and coils 62 formed by concentrated windings around the bobbins 60. Since all six of the coiled pole portions 50 are of the same structure, some reference numbers are omitted in FIG. 3.

Figure 4A:
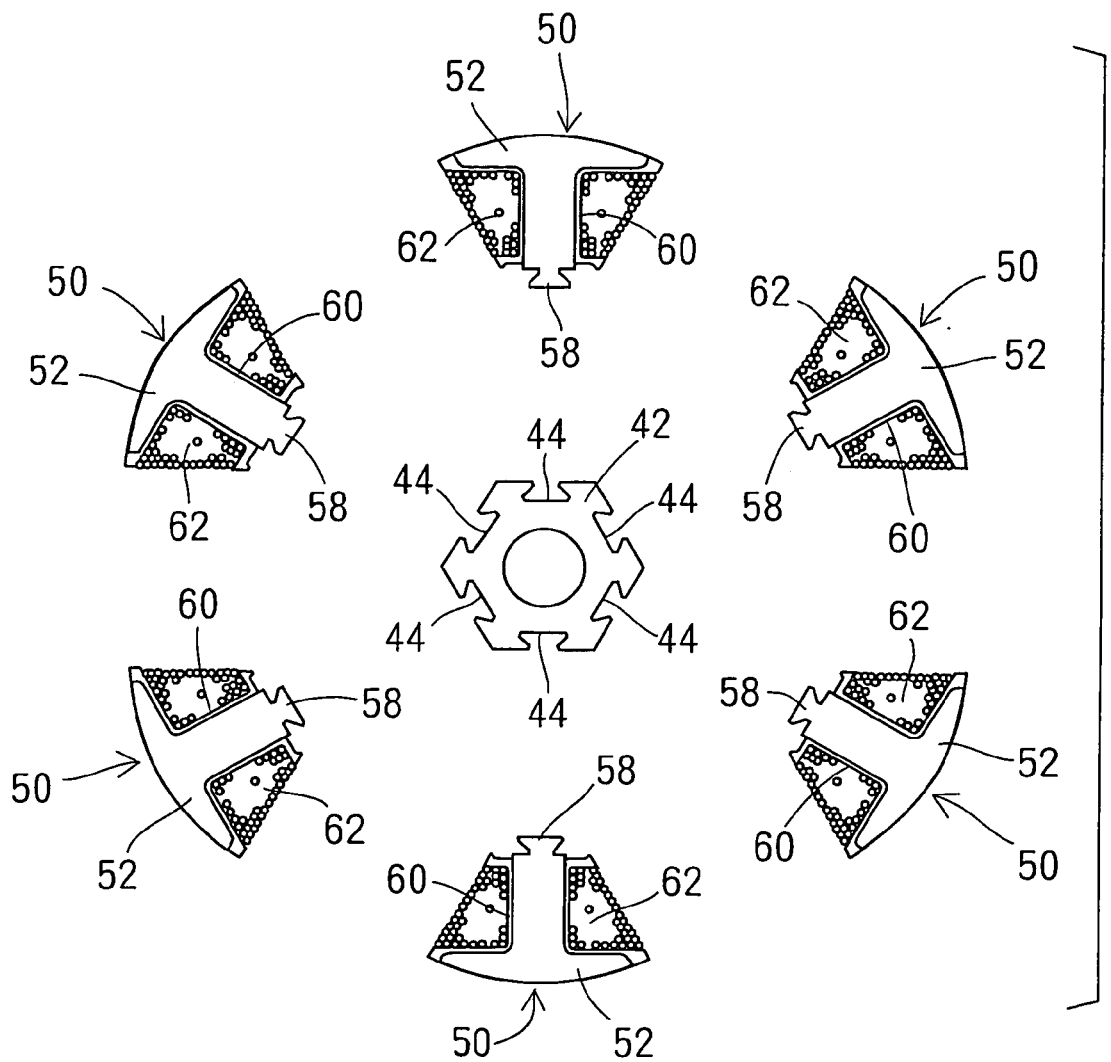
FIG. 4A is a perspective view of a center core and an outer core before their assembly.
Figure 4B:
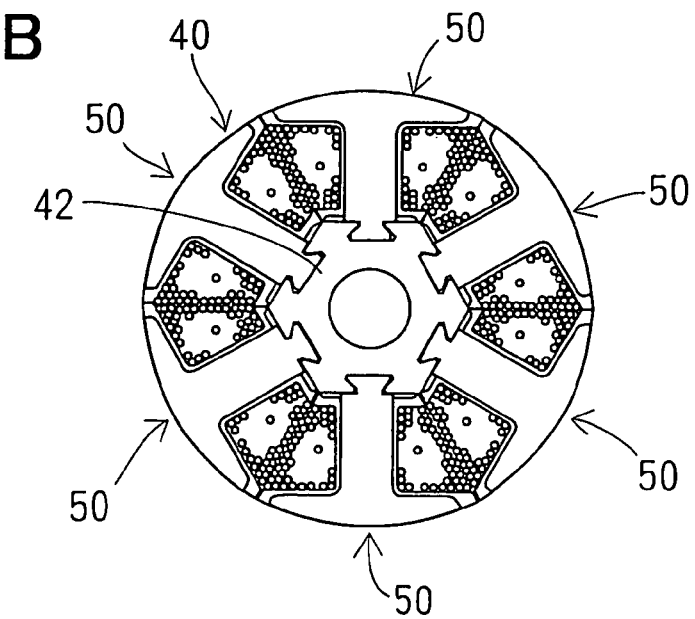
FIG. 4B is a perspective view describing the center core and the outer core of FIG. 4A after their assembly.

As shown in FIG. 4A, the coil cores 52 are members separate from the center core 42. Referring to FIG. 3, the coil core 52 has an outer circumference portion 54 that faces the permanent magnet 30 along the direction of rotation, and a coil winding portion 56 which is plate-shaped and extends from the outer circumference portion 54 toward the center core 42. Each of the coil cores 52 is thus formed in a T-shape viewed in a cross-section perpendicular to the shaft 41 of the armature 40. A peripheral face 55 of the outer circumference portion 54 is formed in the shape of a smooth arc. The size of a clearance formed along the rotational direction by the peripheral face 55 of the outer circumference portion 54 and the inner peripheral face 31 of the permanent magnet 30 is uniform. The coil winding portion 56 has a raised portion 58 extending toward the rotational shaft at a portion thereof nearest the center core 42. The width of the raised portion 58 increases gradually in the radial direction toward the center core 42. The depressed portions 44 and the raised portions 58 are mated together by inserting the raised portions 58 into the depressed portions 44 along the axial direction, respectively.

The bobbin 60 covers the coil core 52 except for the peripheral face 55 of the outer circumferential portion 54 and the raised portion 58. The bobbin 60 magnetically insulates the outer circumferential portions 54 of the coil cores 52 which are mutually adjacent in the direction of rotation. In cross-sections through and including the shaft 41, the bobbin 60 sandwiches the coil winding portion 56 and forms a trapezoid winding space whose width decreases in the direction from the outer circumferential portion 54 toward the center core 42. The coil 62 is formed by winding coils in this winding space.

With reference to FIG. 2, an end of each of the coils 62 near the commutator 70 is electrically connected to the first terminal 64. The first terminals 64 correspond to the location of each of the coils 62 in the direction of rotation, and fit with second terminals 74 near the commutator 70 so as to be electrically connected thereto. Ends of the coils 62 near the impeller 20, opposite to the commutator 70, are electrically connected to third terminals 66. The third terminals 66 are three successively adjacent terminals, one after the other in the direction of rotation, and are electrically connected by fourth terminals 68.

The commutator 70 is cartridge-style and formed as a single body. With the shaft 41 being press fitted into the center core 42, the shaft 41 is inserted into bore 71 of the commutator 70 to attach the commutator 70 to the armature 40, at which time, claws 74a of the second terminals 74, which project toward the armature 40, fit respectively with the first terminals 64 of the armature 40 to be electrically connected thereto. A first C-ring 100 is press fitted onto the shaft 41 to prevent detachment of the commutator 70 from the shaft 41.

Figure 10:
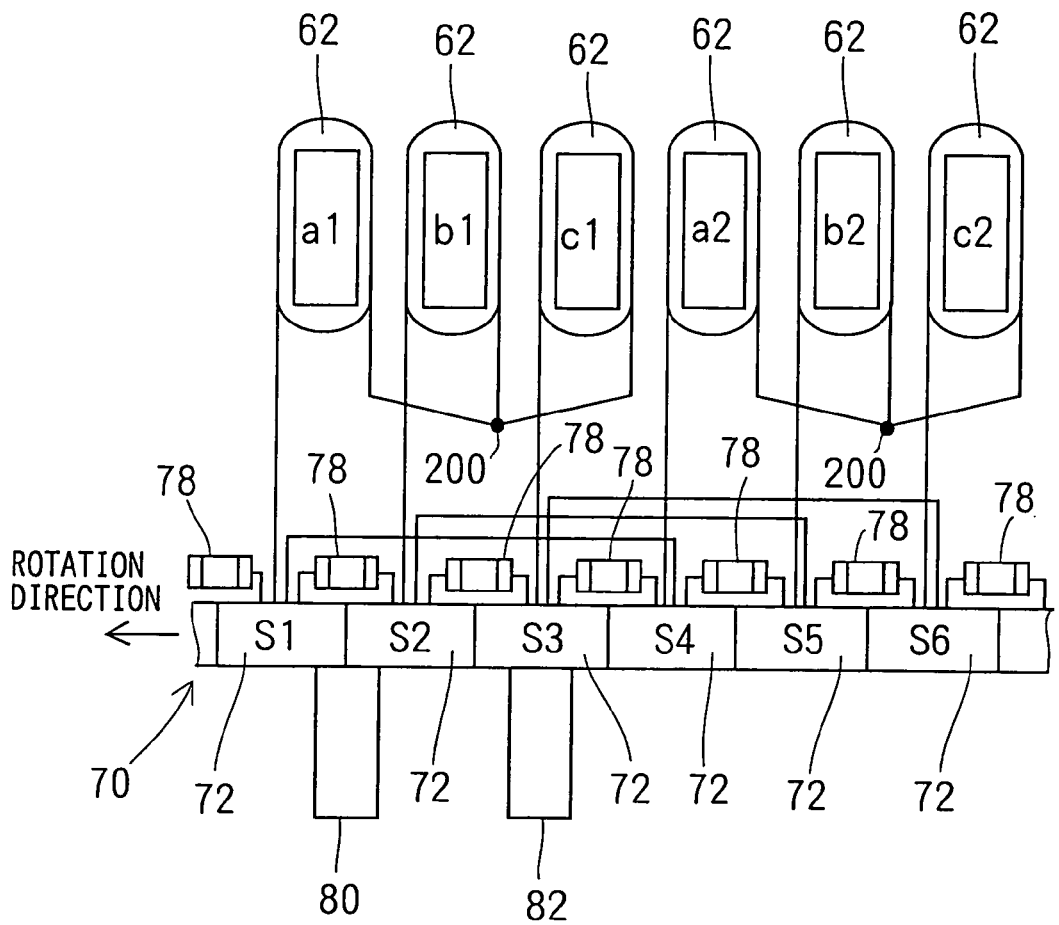
FIG. 10 is a schematic diagram showing connections of coils and capacitors according to the first embodiment.

The commutator 70 comprises six segments 72 disposed in the rotational direction. The segments 72 are formed, for example, from carbon, and they are mutually electrically insulated by an air-gap or by an insulating resin portion 76. Each of the segments 72 is electrically connected to the second terminals 74 via mid-terminals 73. The commutator 70 is formed through insert molding of the insulating resin portion 76 to join the segments 72 (excluding surfaces which contact with brushes 80 and 82 discussed later), the mid-terminals 73, the second terminals 74 (excluding end portions thereof), and capacitors 78 (discussed later) into a single body. Referring to FIG. 10, when the commutator 70 rotates together with the armature 40, each of the segments 72 successively contacts the brushes 80 and 82. First brush 80 is the positive brush, and second brush 82 is the negative brush (ground side). Electrical power passes a fifth terminal 79 press fitted into the outlet cover 19, the first brush 80, the segments 72, the mid-terminals 73, the second terminals 74, and the first terminals 64 to be supplied to the coils 62 of the armature 40. The permanent magnet 30, the armature 40, the commutator 70, and the brushes 80 and 82 constitute a direct current motor.

Figure 1A:
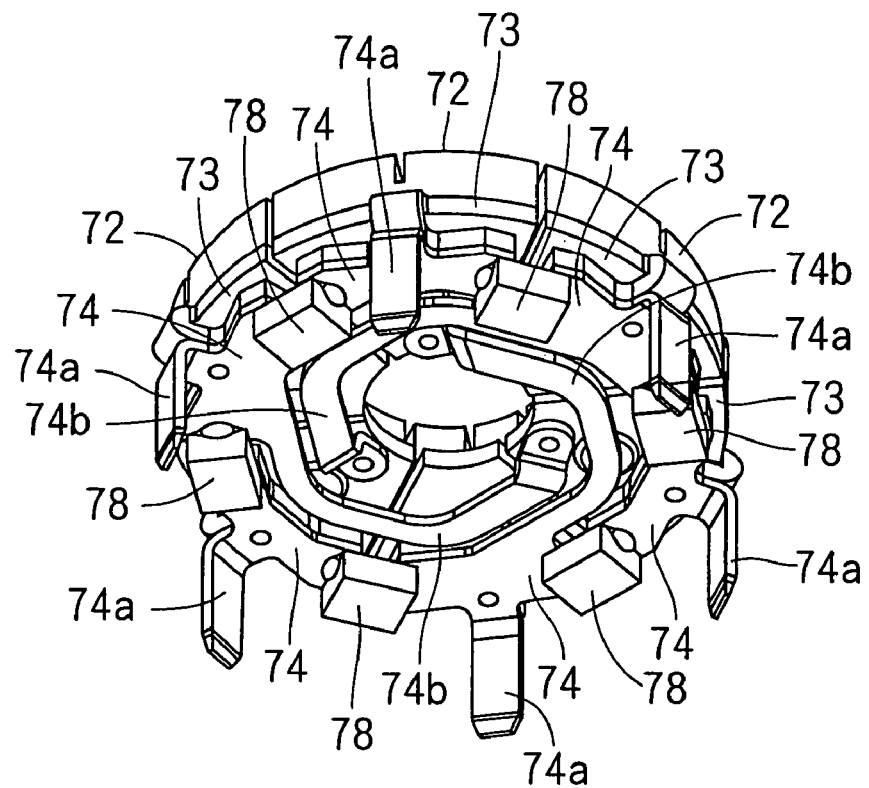
FIG. 1A is a perspective view of a commutator viewed from an armature side with its insulating resin portion detached according to a first embodiment of the present invention.
Figure 1B:
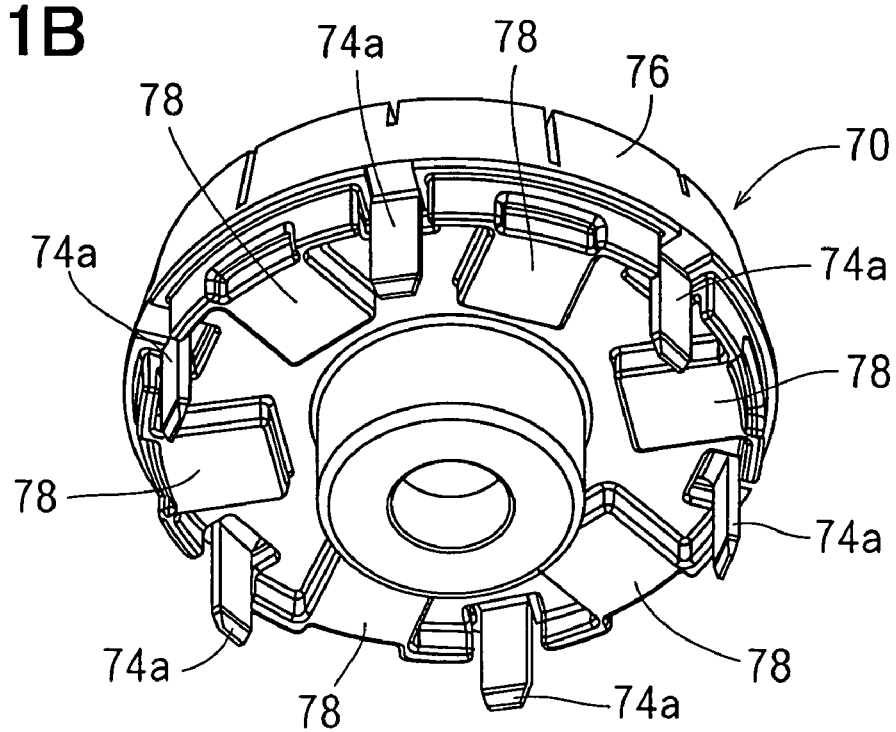
FIG. 1B is a perspective view of the commutator of FIG. 1A viewed from the armature side, shown after molding of the insulating resin portion.

The structure of the mid-terminals 73 and the second terminals 74 of the commutator 70 will now be discussed referring to FIGS. 1A and 1B. FIG. 1A shows the commutator 70 without the insulating resin portion 76, and FIG. 1B shows the commutator 70 after the insulating resin portion 76 has been molded. Reference numeral 78 in FIG. 1B represents the location of the capacitors 78 when covered by the insulating resin portion 76.

Referring to FIG. 1A, the mid-terminals 73 are held between the second terminals 74 and the segments 72, such that the second terminals 74 are electrically connected to the segments 72 through the mid-terminals 73. The mid-terminals 73 extend radially inward within the commutator 70. The number of the second terminals 74 is six to match with the number of the segments 72. Each of the second terminals 74 comprises one of the claws 74a to fit with the first terminals 64 of the armature 40. Three of the six second terminals 74 are located alternately (non-adjacently) in the direction of rotation, the three comprising arc-shaped connecting extensions 77b which extend in the same direction of rotation. The end portion of each of the connecting extensions 77b projects toward the mid-terminals 73. Each of the connecting extensions 77b passes through a radial inner side of the second terminals 74 located in the direction being extended while avoiding mutual contact, and the end portions of the connecting extensions 77b electrically connect with the mid-terminals 73 facing in radial opposition. Thus, pairs of the segments 72 which are mutually facing and are radially opposite are electrically connected. The capacitors 78 are box-shaped, with terminals exposed on one face thereof. The capacitors 78 are disposed on a surface of the commutator 70 on the side opposite to the commutator surface, (the side opposite to the surface which contacts with the first brush 80), that is, on a surface nearest the armature 40. Terminals of the capacitors 78 are brazed directly to the second terminals 74 adjacent in the direction of rotation and are thus electrically connected.

Figure 5:
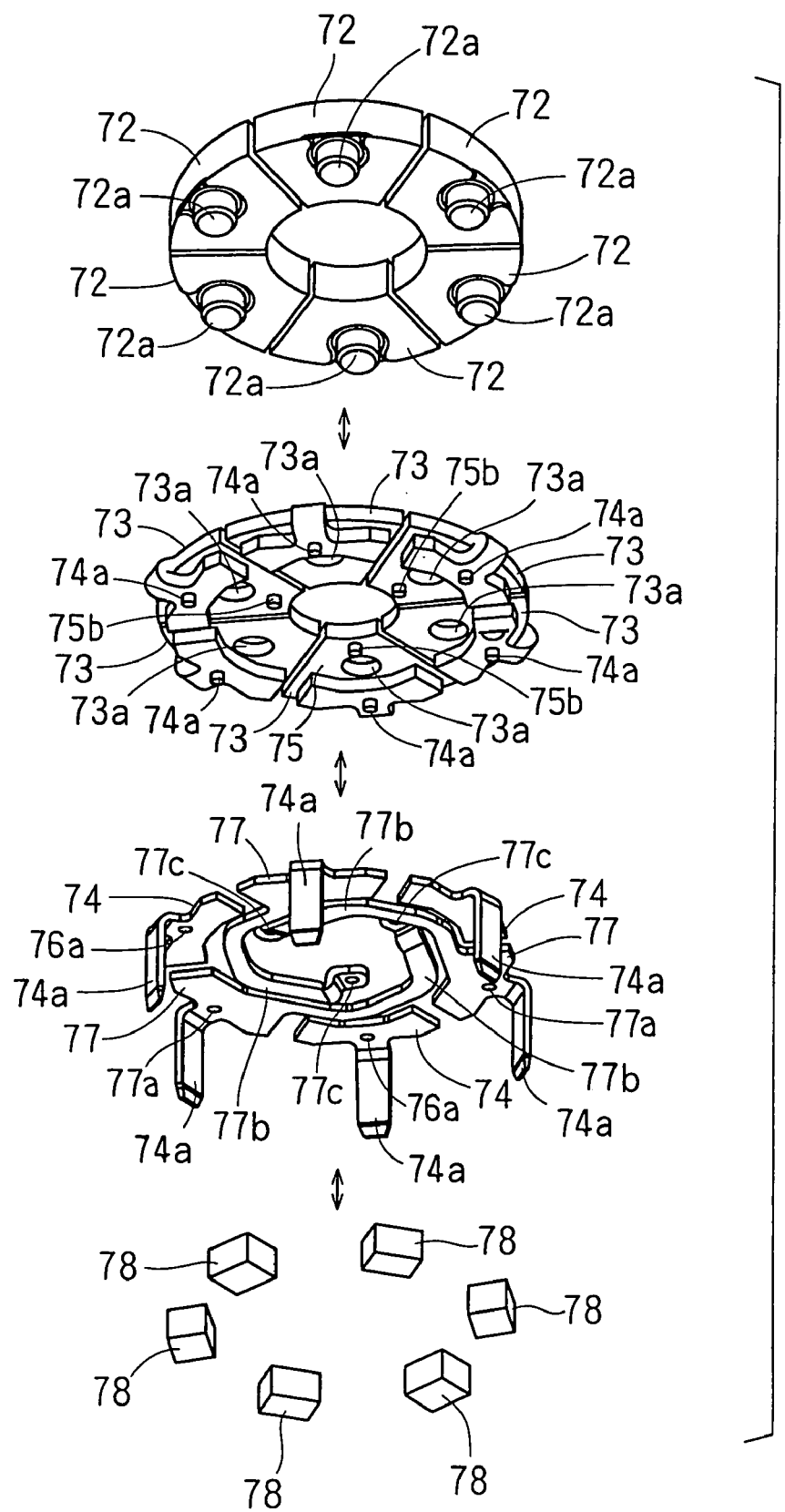
FIG. 5 is an exploded perspective view of the commutator of FIG. 1A without its insulating resin portion.

FIG. 5 is a perspective view of the commutator 70, without the insulating resin portion 76 as shown in FIG. 1A, revealing each member. Large projections 72a are formed on the segments 72. The segments 72 and the mid-terminals 73 are joined by fitting the large projections 72a with large holes 73a formed in the mid-terminals 73. First small projections 74a are formed at the outer circumference of the segments 72 and encircle the large holes 73a. Each of the segments 72 comprises one of the first small projections 74a. Second small projections 75b are formed within the inner circumference of the large holes 73a on the mid-terminals 73 which join with the connecting extensions 77b. First small holes 76a are formed on each of the second terminals 74 near the claws 74a, and second small holes 74d are formed in the end portions of the connecting extensions 77b. The mid-terminals 73 and the second terminals 74 are joined by fitting of the first small projections 74a with the first small holes 76a and also fitting of the second small projections 75b with the second small holes 74d.

Referring to FIG. 10, by the joining of the segments 72, the mid-terminals 73, the second terminals 74, and the capacitors 78 as has been explained, a segment S1 and a segment S4 are electrically connected, as are likewise a segment S2 and a segment S5, and a segment S3 and a segment S6, all of commutator 70. Segments of the segments 72 adjacent in the direction of rotation are connected by the capacitors 78. In FIG. 10, a1, b1, c1, a2, b2, and c2 represent the coils 62 disposed on the armature 40 in the direction of rotation in that order, and S1, S2, S3, S4, S5, and S6 represent the segments 72 disposed in the commutator 70 in the direction of rotation in that order.

Figure 6:
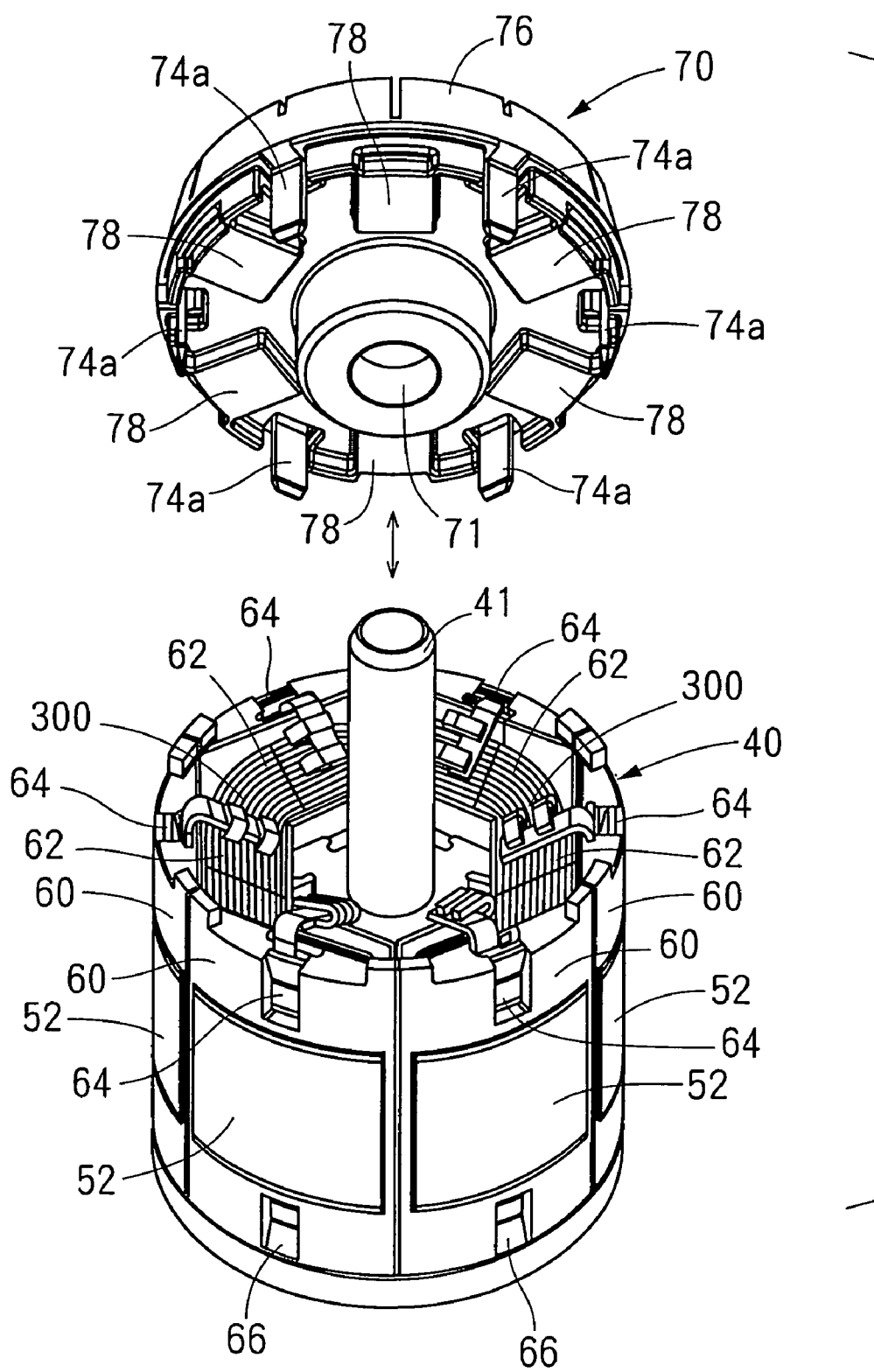
FIG. 6 is a perspective view of the commutator of FIG. 1B and an armature immediately prior to their assembly, according to the first embodiment.
Figure 7:
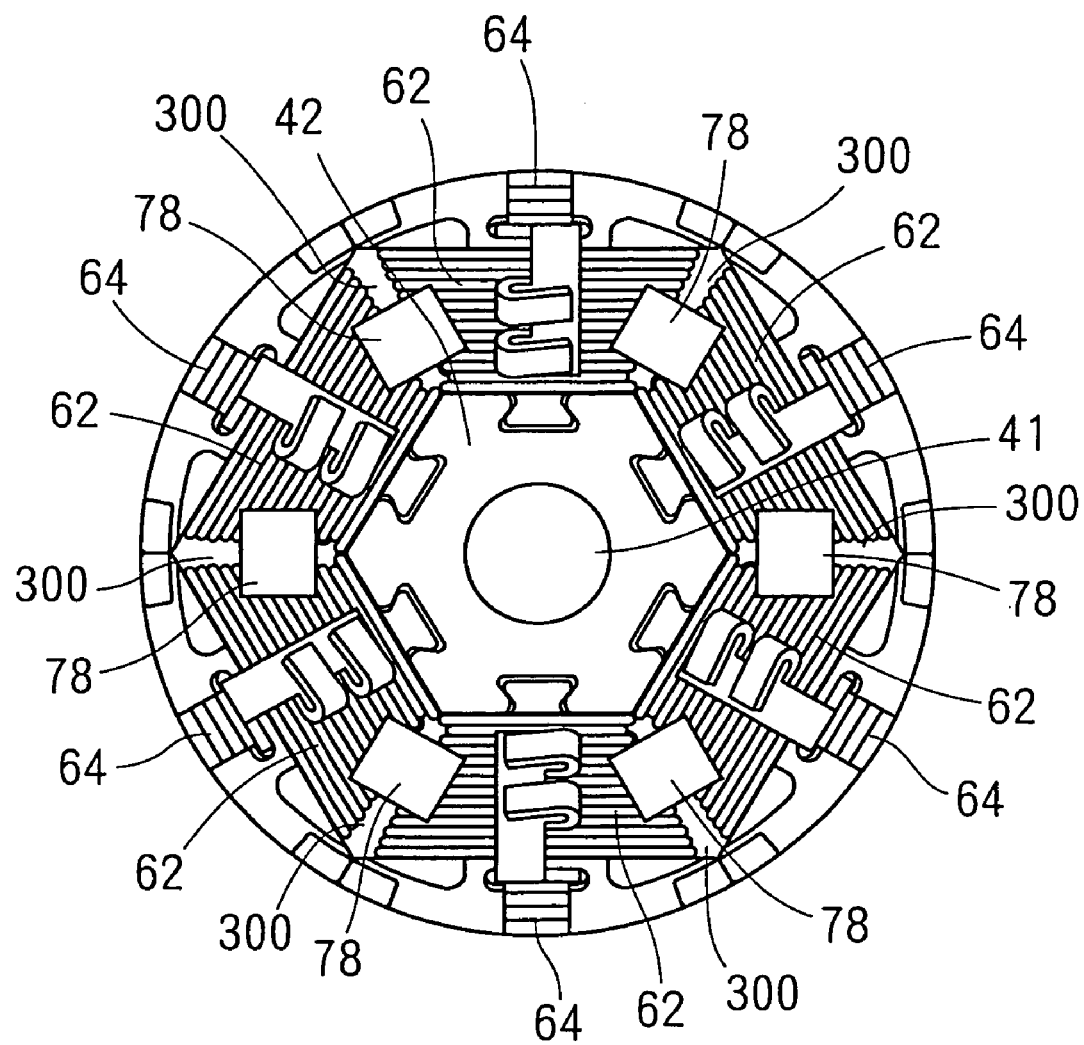
FIG. 7 is a perspective view of the armature of FIG. 6 viewed from the commutator showing placement locations of capacitors.
Figure 8A:
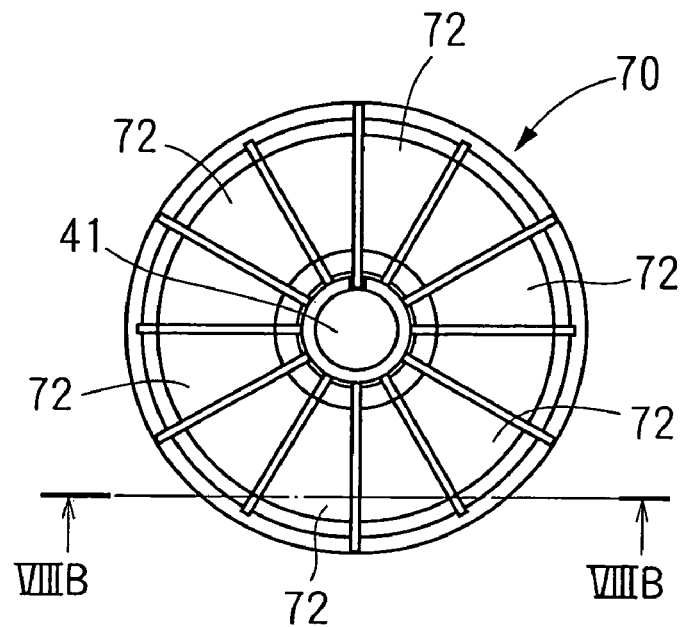
FIG. 8A is a perspective view of a motor according to the present invention as viewed from the brushes.
Figure 8B:
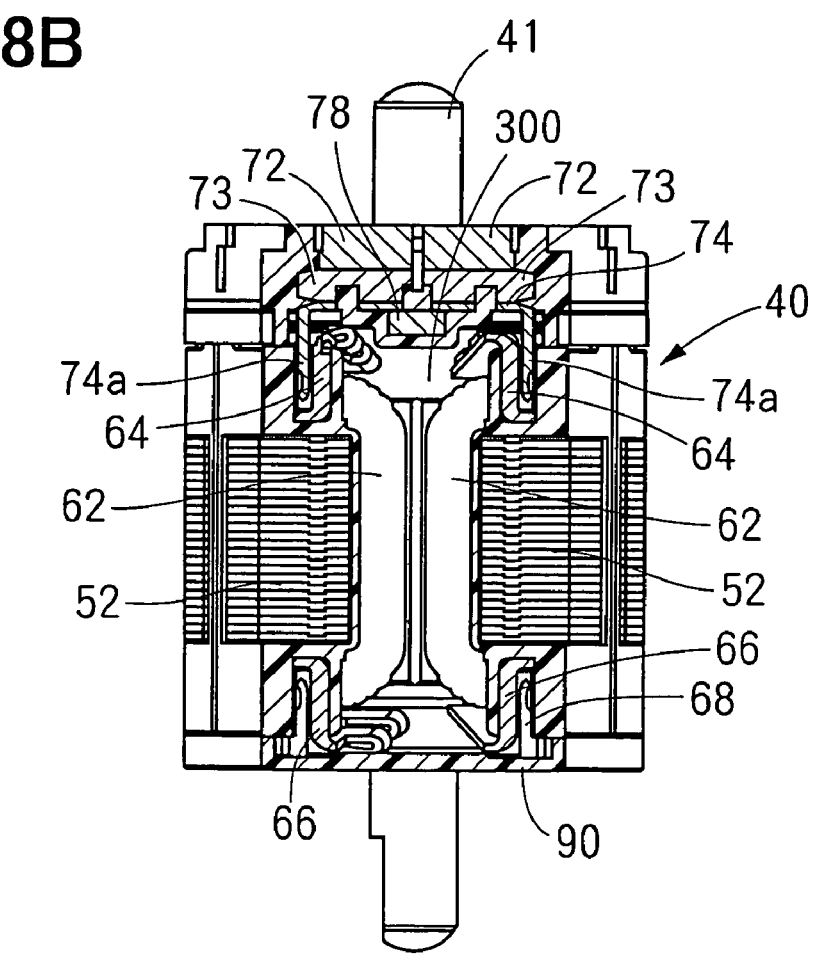
FIG. 8B is a cross-sectional view taken along the line VIIIB—VIIIB of FIG. 8A.
Figure 9A:
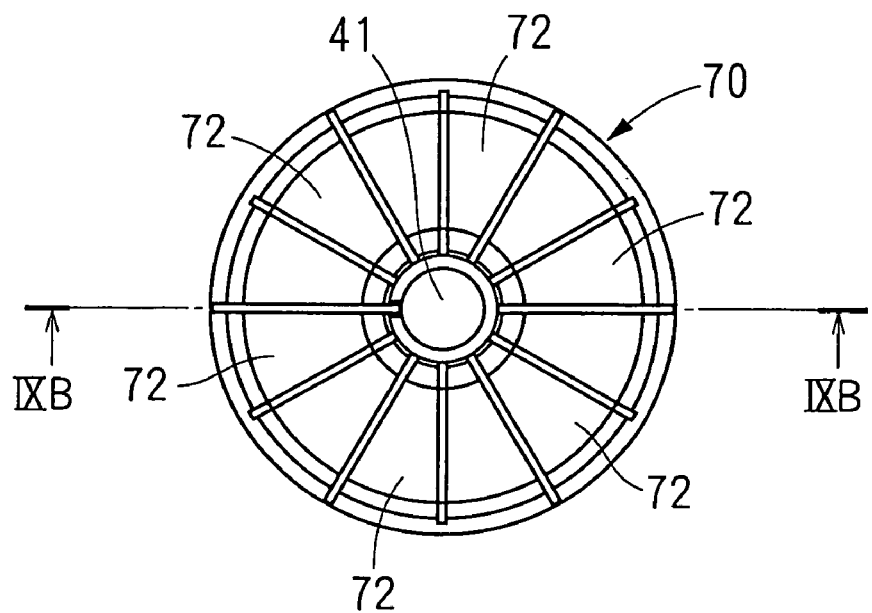
FIG. 9A is a view of the motor from the brushes.
Figure 9B:
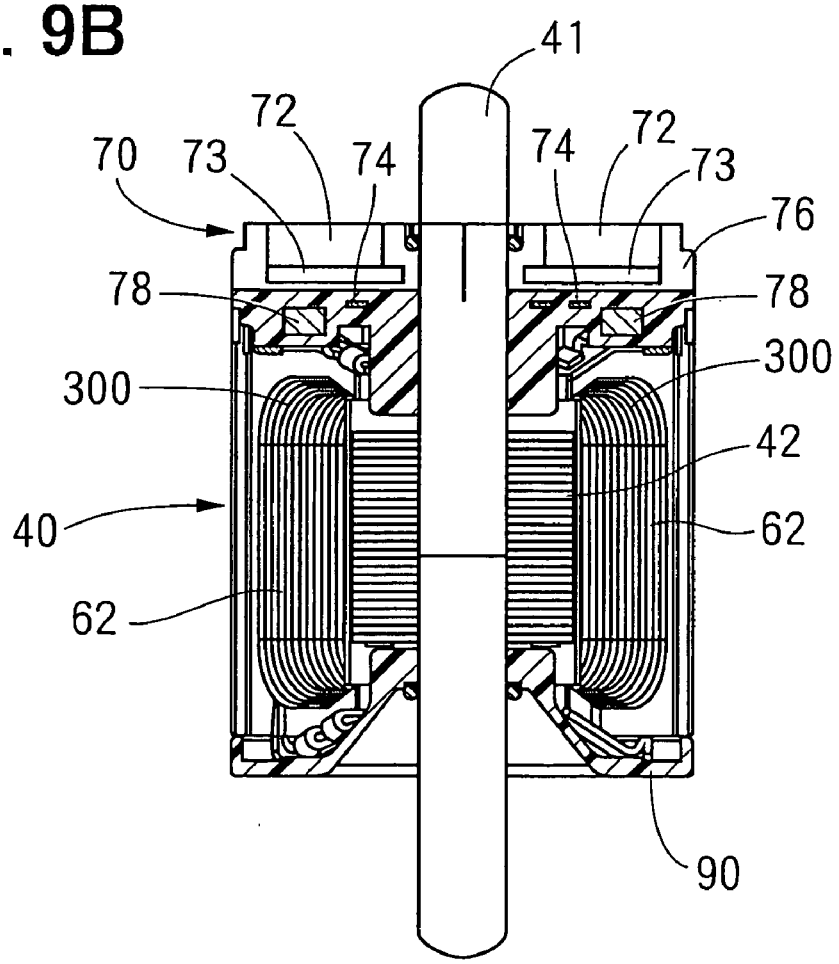
FIG. 9B is a cross-sectional view taken along the line IXB—IXB of FIG. 9A.

As shown in FIGS. 6 and 7, the locations in the direction of rotation of the capacitors 78 covered by the insulating resin portion 76 (reference numeral 78 in FIG. 6 indicating the location of the capacitors 78 covered by insulating resin portion 76) correspond to recessed portions 300 formed between the coils 62 adjacent in the direction of rotation near the commutator 70. The capacitors 78 are also located between the first terminals 64 adjacent in the direction of rotation, as well as between the claws 74a of the second terminals 74 near the commutator 70 which fit with the first terminals 64 near the armature 40. FIG. 6 is a perspective view of the commutator 70 as viewed from the armature 40 and of the armature 40 as viewed from the commutator 70. FIG. 7 is a view of the armature 40 as seen from the direction of the commutator 70. Further, the locations of the capacitors 78 at the locations of the cross-sections of FIGS. 8A and 9A are shown respectively in FIGS. 8B and 9B. By bringing the capacitors 78 into proximity of the recessed portions 300 existing between the first terminals 64 adjacent in the direction of rotation to assemble the armature 40 with the integrated body of the commutator 70 and the capacitors 78 formed from molding of the insulating resin portion 76, the axial length of a motor comprising the commutator 70 and the armature 40 can be shortened. Since the commutator 70 and the capacitors 78 are resin molded and constitute a single, integrally formed body, they can be easily assembled with the armature 40.

According to the first embodiment, the locations in the direction of rotation of the capacitors 78 are matched with the recessed portions 300 formed between the coils 62 adjacent in the direction of rotation near the commutator 70. However, as long as the recessed portions 300 are formed in the armature 40 near the commutator 70, the locations of the capacitors 78 in the direction of rotation may be matched to any sort of recessed portion.

Where the rated output of a motor, that is, the fuel pump 10, is O [W], the number of pole pairs of the permanent magnets 30 is P, and the total electrostatic capacity of the capacitors 78 is C [μF], the total electrostatic capacity C is predetermined such that expression (1) is satisfied. The number of pole pairs of the permanent magnets 30 is equal to (total number of pieces of the permanent magnets 30)/2.

$$0.02*O*P<C<0.2*O*P \quad (1)$$

Thus, for example, when the rated output O is from 20 to 30 W, and the number of pole pairs P with the fuel pump 10 according to the first embodiment is 2 ((total number of pieces of permanent magnets 30)/2=2), then a range where the total electrostatic capacity C of the six capacitors 78 satisfies expression (1) is defined as 0.8 to 1.2<C<8.0 to 12.0.

Figure 11:
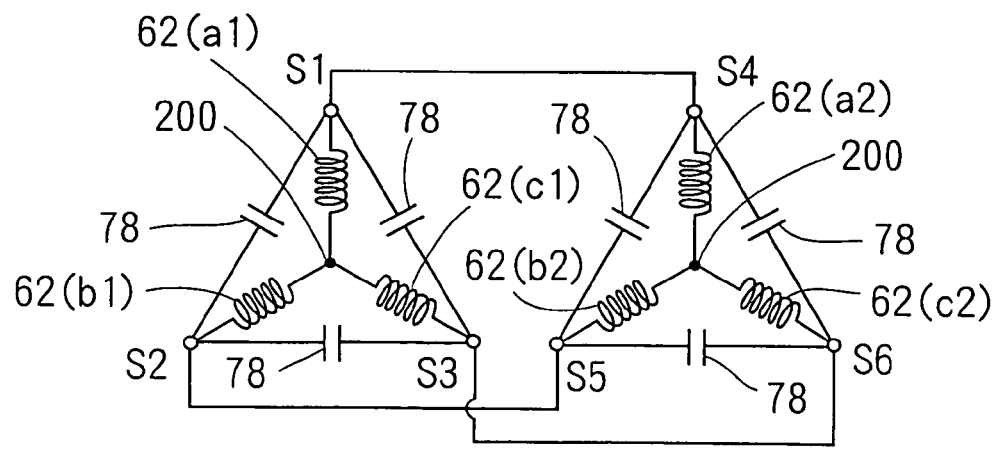
FIG. 11 is a circuit diagram showing connections of coils and capacitors according to the first embodiment.

Ends of the coils 62 near the commutator 70 are electrically connected to the segments 72, and the ends of the coils 62 opposite to the commutator 70 are electrically connected together. The ends of the coils 62 opposite to the commutator 70 form a neutral point 200 of a star connection. That is, with reference to FIG. 11, three of the coils 62 forming a star connection are connected in parallel.

Referring to FIG. 2, the cover 90 covers the axial end of the armature 40 opposite to the commutator 70, and thus resistance of the armature 40 rotating within the fuel is decreased. The cover 90 comprises a large depression portion 92 in the center portion thereof surrounding the shaft 41. A portion of both the first axle bearing 26 and the pump casing 16 is disposed within the large depression portion 92. A second C ring 102 is press fitted onto the shaft 41 to prevent the cover 90 from detaching from the shaft 41.

Figure 12:
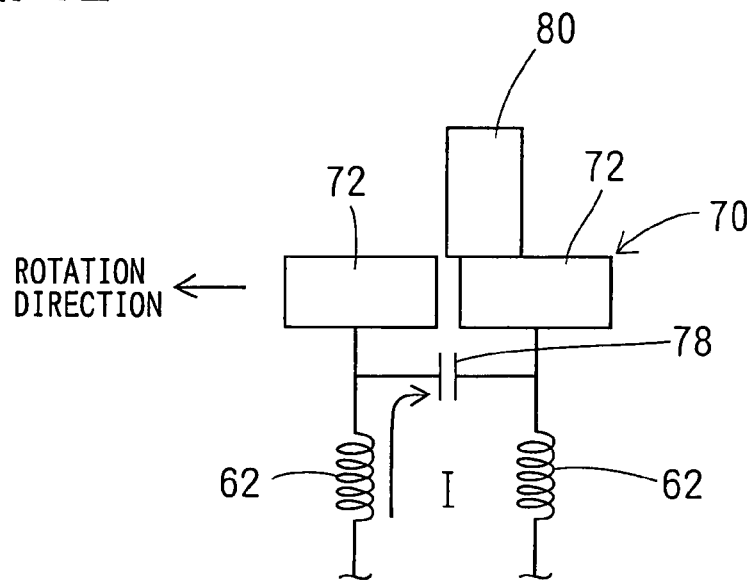
FIG. 12 is a circuit diagram showing the flow of current during discharge.

With reference to FIG. 12, when the first brush 80 separates from the segments 72 accompanying rotation of the armature 40, there is the undesirable possibility that electromagnetic energy built up in the coils 62 will flow between the segments 72 and the first brush 80, and that discharge will occur between the segments 72 and the first brush 80. According to the first embodiment, since the capacitors 78 are electrically connected to the second terminals 74 of the segments 72 adjacent in the direction of rotation, electromagnetic energy built up in the coils 62 is temporarily built up in the capacitors 78 when the first brush 80 separates from the segments 72. Accordingly, a sudden addition of electromagnetic energy discharged from the coils 62 between the segments 72 and the first brush 80 is prevented. As a result, even when the first brush 80 separates from the segments 72, discharge does not occur between the first brush 80 and the segments 72, and thus discharge wear of the segments 72 and the first brush 80 can be prevented. Accordingly, favorable electrical contact between the segments 72 and the brush 80 can be maintained. When the segments 72 and the first brush 80 are in contact, current from the coils 62 flows to the first brush 80 through the segments 72.

According to the first embodiment, by joining the coils 62 through a star connection, voltage applied to the coils 62 is smaller when compared to the delta connection of the second embodiment discussed later. Electromagnetic energy built up in the coils 62 is smaller, and thus the electrostatic capacity of the capacitors 78 can be smaller to fall within a range where expression (1) is satisfied.

Also according to the first embodiment, the capacitors 78 are disposed in the commutator 70 and are electrically connected to the second terminals 74 of the segments 72, however, the capacitors 78 can be disposed and connected at any suitable location as long as they are connected to a circuit formed by the coils 62 and the segments 72 and can temporarily build up electromagnetic energy built up in the coils 62.

Second Embodiment

Figure 13:
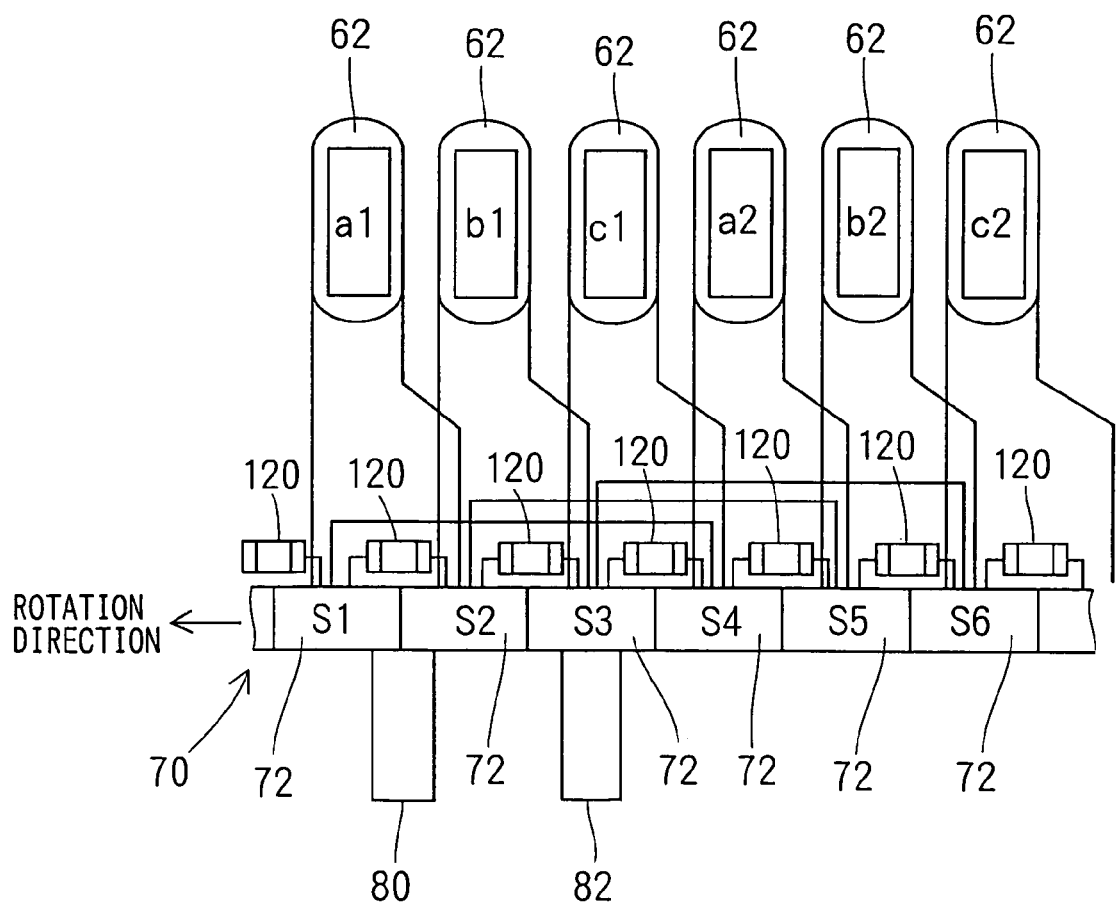
FIG. 13 is a schematic diagram showing connections of coils and capacitors according to a second embodiment.
Figure 14:
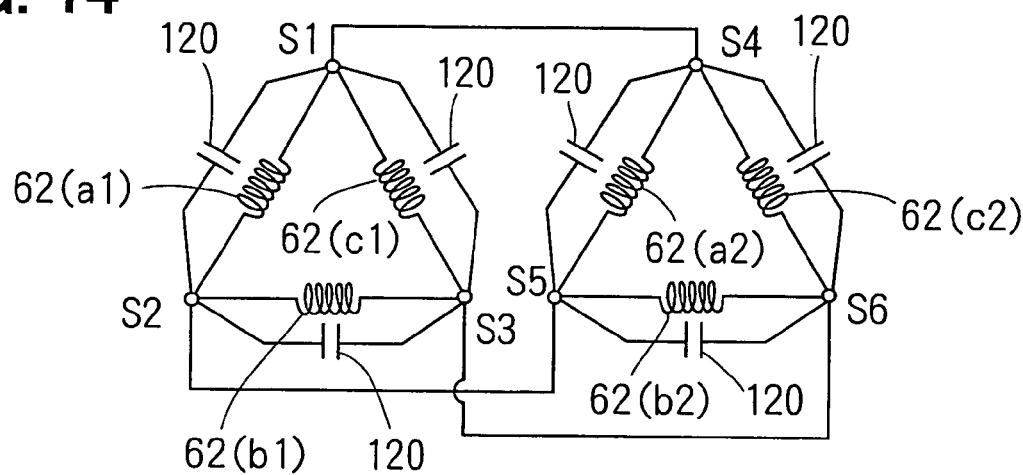
FIG. 14 is a circuit diagram showing connections of coils and capacitors according to the second embodiment.

A second embodiment according to the present invention is shown in FIGS. 13 and 14. Structural portions thereof which are substantially the same as those of the first embodiment are given the same reference numerals. According to the second embodiment, three of the coils 62 adjacent to each other in the direction of rotation are connected in parallel by a delta connection. Compared to the star connection of the first embodiment, voltage applied to the coils 62 is high, and thus electromagnetic energy built up in the coils 62 is large. Accordingly, the electrostatic capacitance of capacitors 120, which store electromagnetic energy, is sometimes larger than that of the capacitors 78 of the first embodiment within a range such that expression (1) is satisfied.

Third Embodiment

Figure 15A:
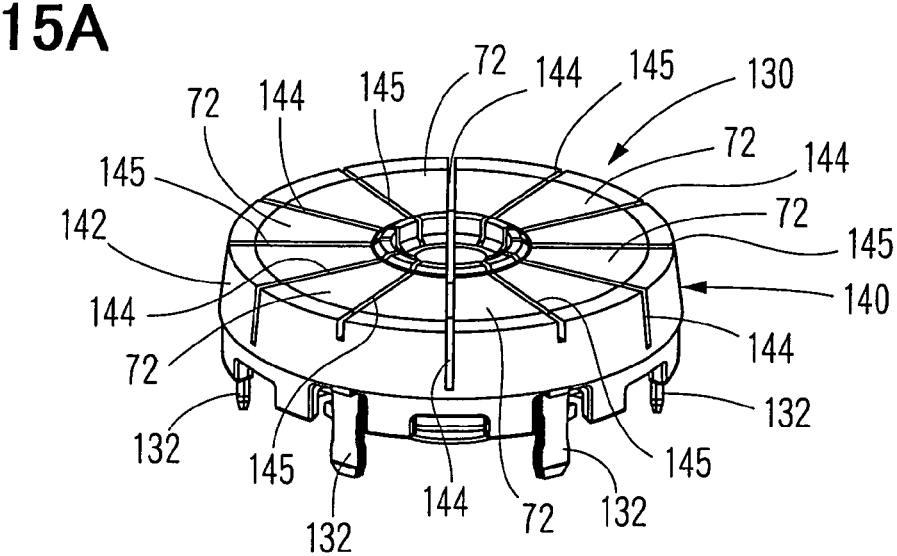
FIG. 15A is a perspective view of a commutator as viewed from the commutator surface side according to a third embodiment.
Figure 15B:
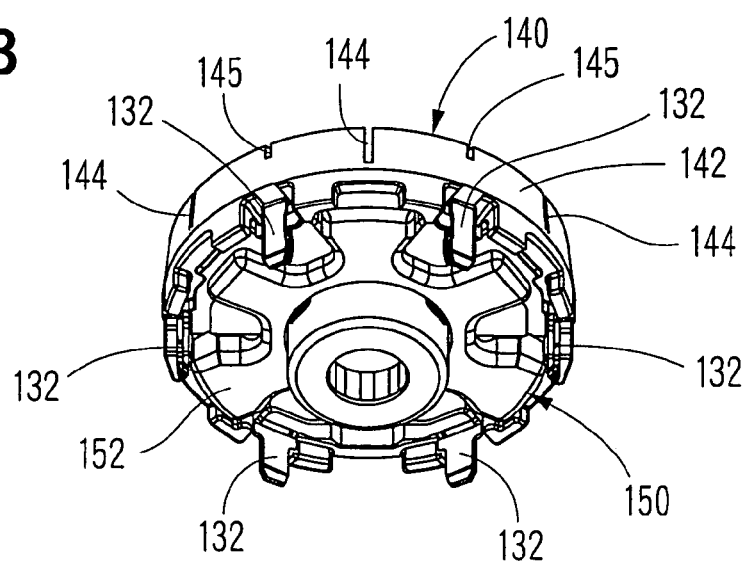
FIG. 15B is a perspective view of the commutator of FIG. 15A as viewed from the armature side.

A third embodiment of a commutator according to the present invention is shown in FIGS. 15A and 15B. Structural portions of the commutator that are substantially the same as those of the first embodiment are given the same reference numerals. A commutator 130 according to the third embodiment has a first formed body 140 near the segments 72, and a second formed body 150 near capacitors 260 (not shown in FIGS. 15A and 15B, but discussed later). Each member of the first formed body 140 is supported by a first insulating resin portion 142, and each member of the second formed body 150 is supported by a second insulating resin portion 152. Claws 132, which are a portion of the commutator terminals of the commutator 130, have first connecting claws 234 of first connecting terminals 232 (discussed later) of the first formed body 140, and second connecting claws 255 of second connecting terminals 254 (discussed later) of the second formed body 150 that are electrically connected through welding. Each of the segments 72 is insulated by slits 144, and grooves 145 are formed on the commutator surface side of each of the segments 72 for draining fuel, that is, a film layer of fuel.

Next, a method for manufacturing the commutator 130 will be discussed while referring to FIGS. 16 to 20B. The method for manufacturing the first formed body 140 will be explained first.

Figure 16:
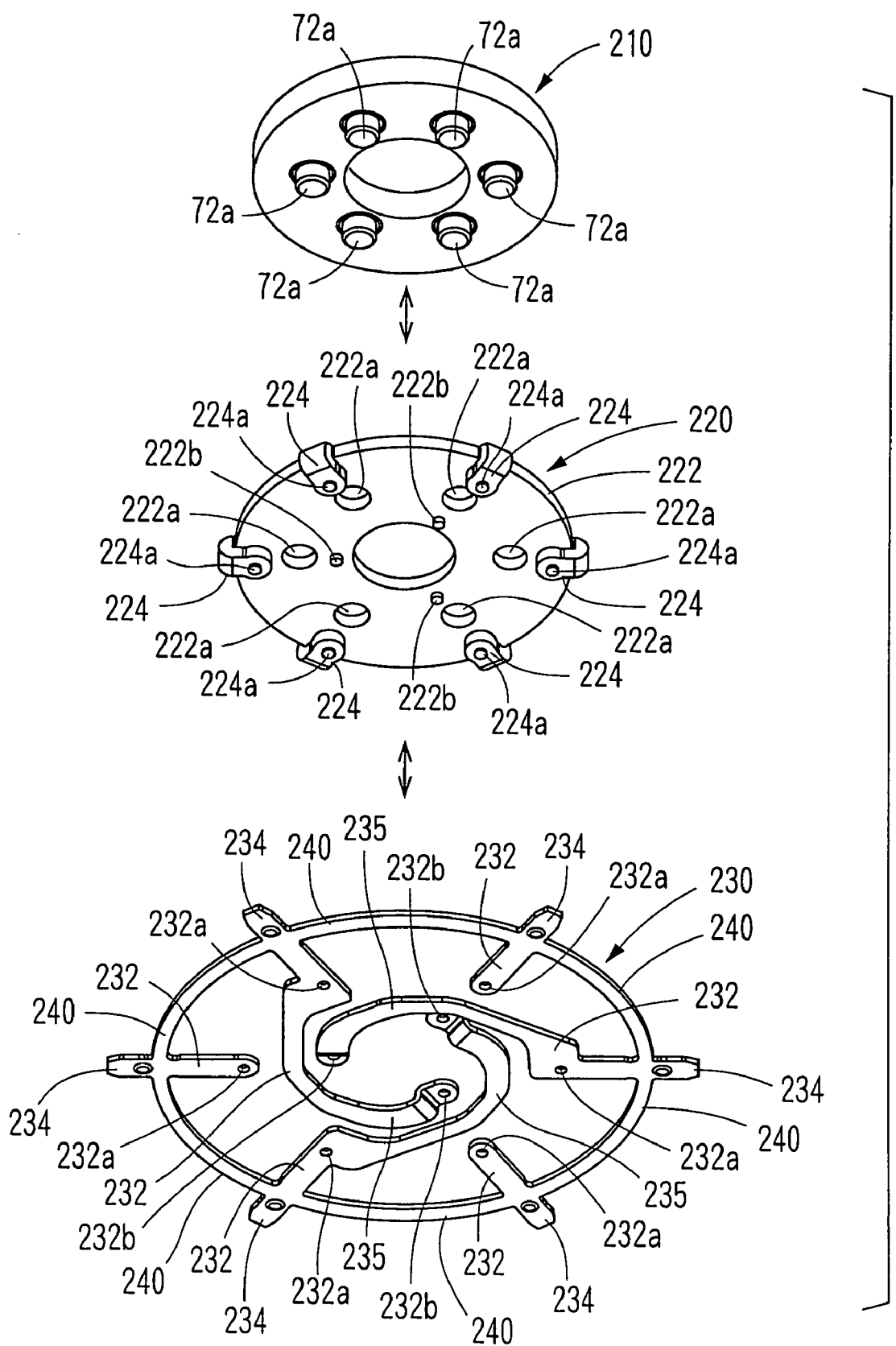
FIG. 16 is an exploded perspective view showing a manufacturing process assembly of a first formed body.

Each base material constituting the first formed body 140 is shown in FIG. 16. Each of base materials 210, 220, and 230 is shown before being sectioned into each of the segments 72. The base materials comprise a segment base material 210 for the segments 72, a middle base material 220 for mid-terminals corresponding to the mid-terminals 73 of the first embodiment, and a first connecting terminal base material 230 for the first connecting terminals 232. In FIGS. 15A and 15B, the mid-terminals are covered by a first insulating resin portion 142 and therefore are not shown. First terminals, which are the mid-terminals and the first connecting terminals 232, and second terminals (discussed later), which are the second connecting terminals 254, constitute the commutator terminals. The middle base material 220 and the first connecting terminal base material 230 constitute the first terminal base materials. The shape of the mid-terminals to be formed from the middle base material 220, as well as the shape of the first connecting terminals 232 to be formed from the first connecting terminal base material 230, differ from the mid-terminals 73 and the second terminals 74 of the first embodiment. However, the mutual electrical connections thereof and the electrical connections thereof with segments 72 are the same as those of the first embodiment. The middle base material 220 has a thin portion 222 shaped as a disk, and thick portions 224 disposed per each of the segments 72. The first connecting terminals 232 of the first connecting terminal base material 230 are mutually joined by a ring frame 240. The thickness of the first connecting terminals base material 230 is thinner than, and almost half of, the thickness of the second terminal 74 of the first embodiment.

(Joining Process)

The large projections 72a are formed on the segment base material 210, and the large projections 72a are fitted with large holes 222a formed in the middle base material 220 to join the segment base material 210 and the middle base material 220. First small projections 224a are formed on the thick portions 224 which are at the outer circumference of the middle base material 220 so as to encircle the large holes 222a. Second small projections 222b are formed within the inner circumference of the large holes 222a where the thin portion 222 joins with connecting extensions 235 of the first connecting terminals 232. First small holes 232a are formed on each of the first connecting terminals 232 of the first connecting terminal base material 230 near the first connecting claws 234, and second small holes 232b are formed in the end portions of the connecting extensions 235. First small projections 224a fit with the first small holes 232a, and the second small projections 222b fit with the second small holes 232b to join the middle base material 220 with the first connecting terminal base material 230.

(First Forming Process)

Figure 17:
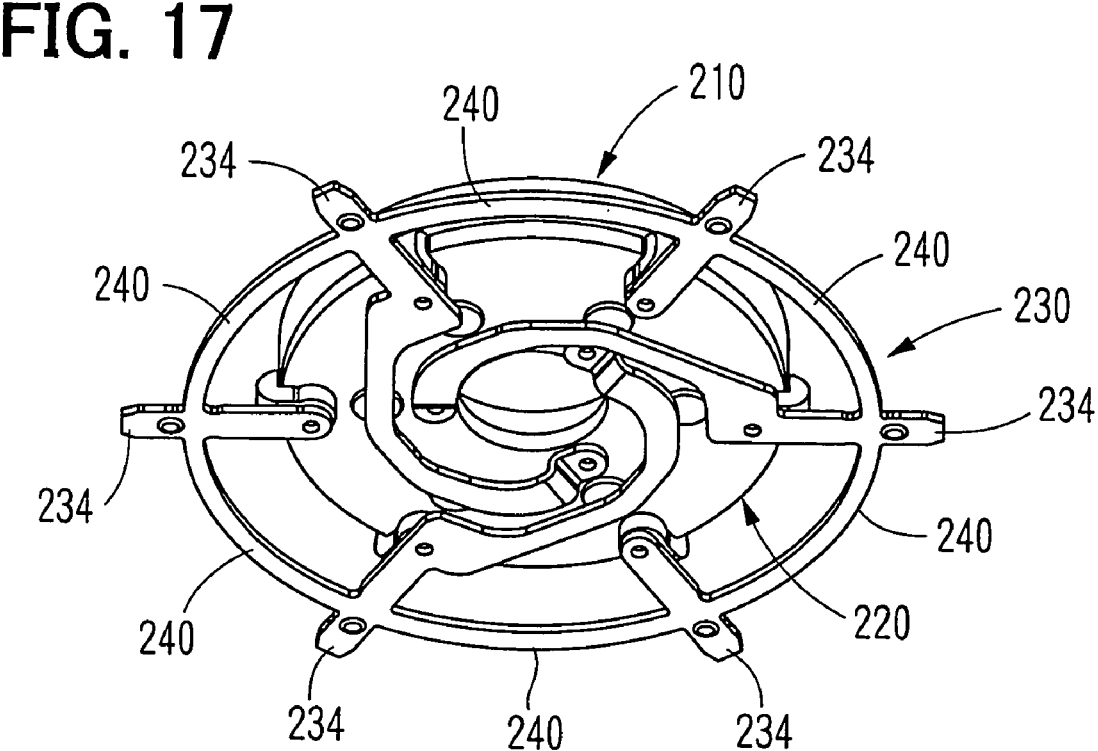
FIG. 17 is a perspective view showing the first formed body prior to resin filling.

The segments base material 210, the middle base material 220, and the first connecting terminal base material 230 of FIG. 16 are shown as a joined structure in FIG. 17. The first insulating resin portion 142 is filled around this structure such that the segment base material 210, the middle base material 220, and the first connecting terminal base material 230 are supported by the first insulating resin portion 142.

(Sectioning Process)

While sectioning the ring frame 240 through press-working, the first connecting claws 234 of the first connecting terminals 232 are bent. Next, while maintaining the state of support of the first insulating resin portion 142, the slits 144 are formed from the commutator surface side of the segment base material 210 through the thin portion 222 of the middle base portion 220, sectioning into each of the segments 72. The slits 144 are formed, for example, by rotating a thin disk having blades of about the same circumference as the disk to section the segment base material 210 and the middle base material 220. The grooves 145 are also formed in commutator surfaces of each of the segments 72 for draining any fuel film. The grooves 145 are shallower than the slits 144. Following this, the commutator surface sides of the segments 72 are polished to complete the fabrication of the first formed body 140, shown in FIG. 18. The mid-terminals and the first connecting terminals 232, formed through sectioning of the middle base material 220 and the first connecting terminal base material 230 per each of segments 72, constitute first terminals.

A method for manufacturing the second formed body 150 will be discussed next. A second connecting terminal base material 250, serving as a second terminal base material, comprises the second connecting terminals 254 acting as second terminals, and a disk portion 252 disposed within the inner circumference of the second connecting terminals 254 and joining each of the second connecting terminals 254. The second connecting terminals 254 comprise the second connecting claws 255 and crimping portions 256. The thickness of the second connecting terminal base material 250 is thinner than, and almost half of, the thickness of the second terminals 74 of the first embodiment. The capacitors 260 comprise main capacitor bodies 262 and lead wires 264 that act as flexible terminals extending from the main capacitor bodies 262.

(First Connecting Process)

Figure 19:
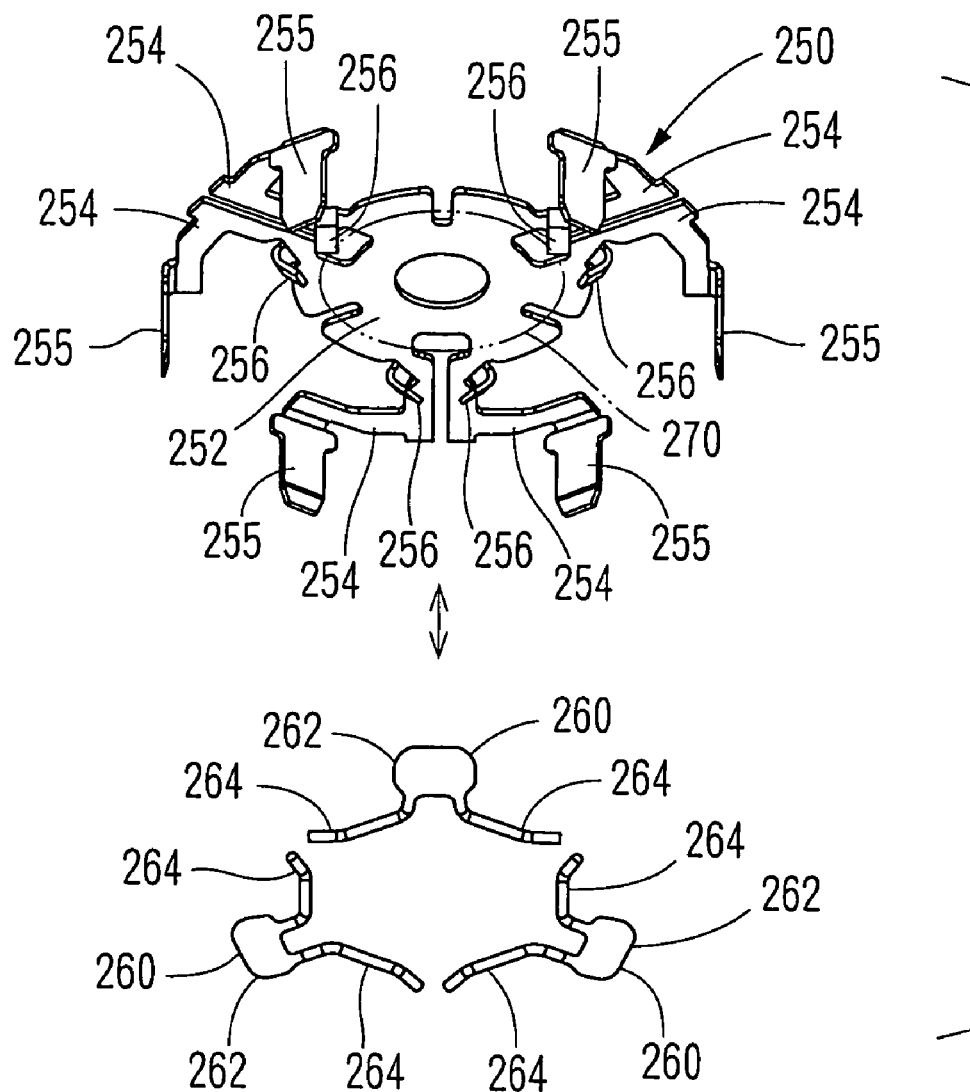
FIG. 19 is an exploded perspective view showing a manufacturing process assembly of a second formed body.
Figure 20A:
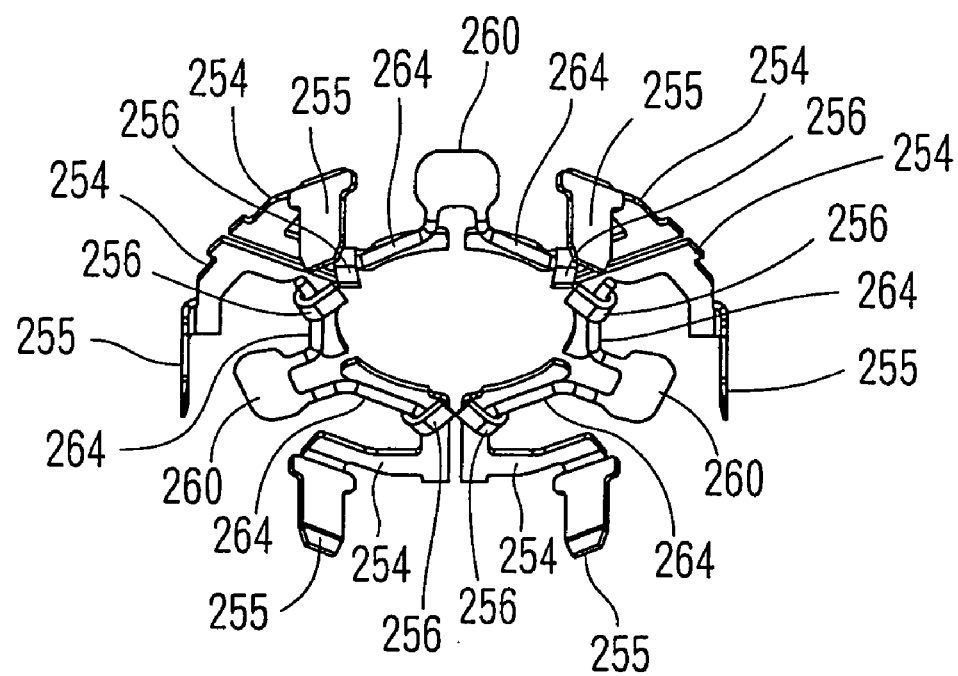
FIG. 20A is a perspective view showing the second formed body prior to resin filling.

Referring to FIG. 20A, the lead wires 264 of the capacitors 260 are inserted to be pinched by the crimping portions 256 of the second connecting terminal base material 250 and hot swaging is performed, whereby the second connecting terminals 254 of the second connecting terminal base material 250 and the capacitors 260 are electrically connected. Then, the portion of the disk portion 252 within the double-dot dashed line 270 shown in FIG. 19 is stamped out by a press or similar means and discarded, sectioning the second connecting terminals base material 250 per each of the second connecting terminals 254. Every two terminals of the second connecting terminals 254, adjacent in the circumferential direction, are connected as a pair by the capacitors 260. Thus, the number of capacitors 260 used for the six, second connecting terminals 254 is three.

(Second Forming Process)

Referring to FIG. 20A, by hot swaging the lead wires 264 of the capacitors 260 with the crimping portions 256 of the second connecting terminals 254, and filling the second insulating resin portion 152 around the structure sectioned per each of the second connecting terminals 254 to support the second connecting terminals 254 and the capacitors 260, fabrication of the second formed body 150 is accomplished.

(Second Connecting Process)

Figure 18:
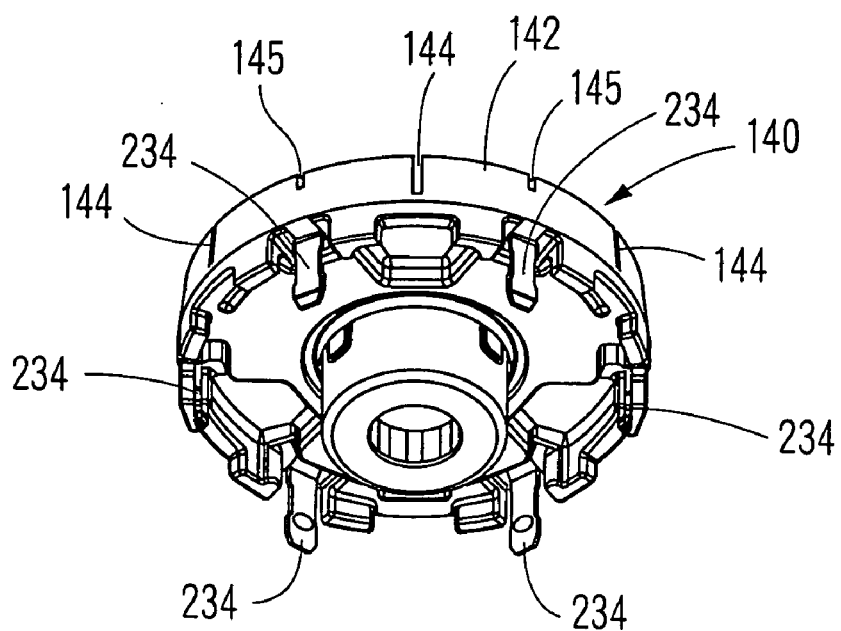
FIG. 18 is a perspective view showing the first formed body.
Figure 20B:
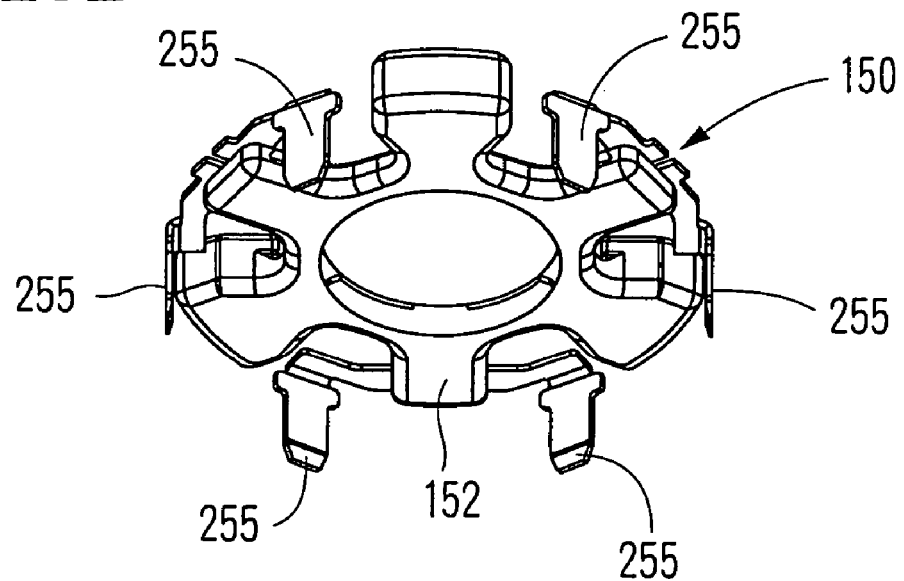
FIG. 20B is a perspective view showing the second formed body after resin filling.

Next, the first formed body 140 shown in FIG. 18 and the second formed body shown in FIG. 20B are joined such that the first connecting claws 234 and the second connecting claws 255 are overlapped. Then, the first connecting claws 234 and the second connecting claws 255 are welded and thereby electrically joined. The manufacture of the commutator 130 is thus accomplished.

Figure 21:
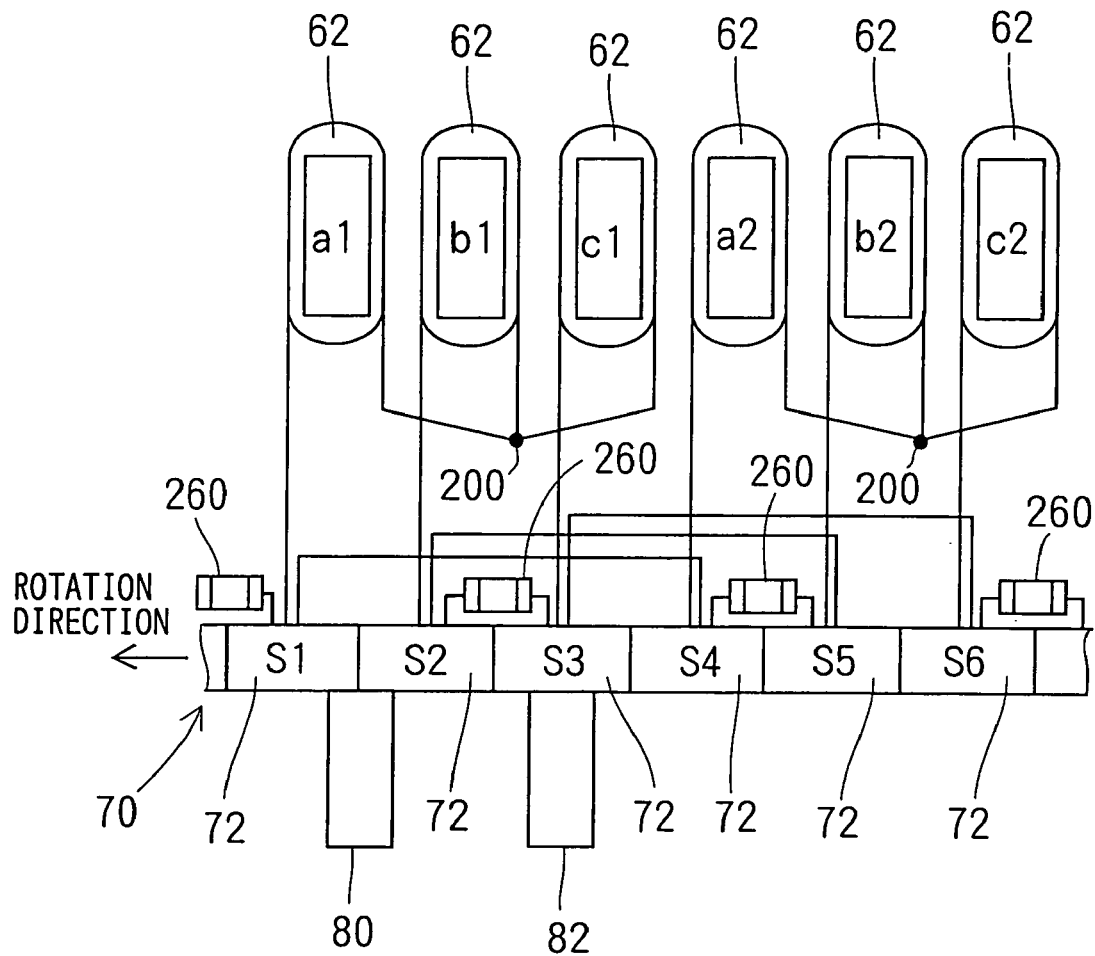
FIG. 21 is a block diagram showing connections of coils and capacitors according to the third embodiment.
Figure 22:
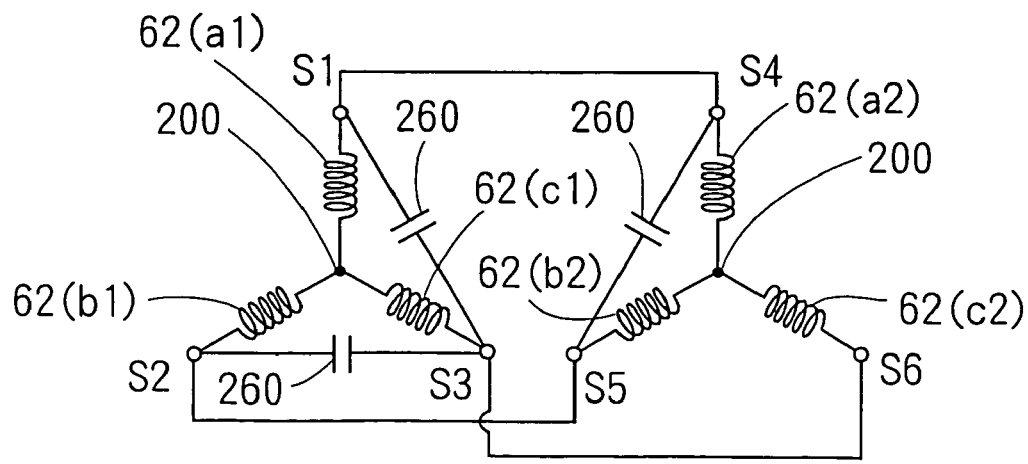
FIG. 22 is a circuit diagram showing connections of coils and capacitors according to the third embodiment.

The electric connection between the thus formed commutator 130 and the coils 62 is shown in FIGS. 21 and 22. Except for the number of the capacitors 260 being reduced from six to three, the structure is the same as that of FIGS. 10 and 11 of the first embodiment. That is, according to the third embodiment, the coils 62 are joined in a star connection in the same manner as in the first embodiment. Accordingly, as long as the rated output O of the fuel pump 10, the electrostatic capacity C of the capacitors 260, and the number of pole pairs P of the permanent magnets 30 are the same as in the first embodiment, then from expression (1), the electrostatic capacity of each of the capacitors 260 may be twice that of the capacitors 78 of the first embodiment.

With the method for manufacturing the commutator 130 according to the third embodiment, the first formed body 140 near the segments 72 and the second formed body 150 near the capacitors 260 are respectively and separately formed first, after which they are joined to complete the manufacture of the commutator 130. Thus, in the sectioning process, vibration that occurs during the dividing of the segments base material 210 and the middle base material 220 into each of the segments 72 does not act on locations where the capacitors 260 and the second connecting terminals 254 are electrically joined. Thus, also, the electrical connections between the capacitors 260 and the second connecting terminals 254 can be maintained. Further, since the capacitors 260 employ the lead wires 264 which have the flexibility to act as capacitor terminals, even when contractive forces of the second insulating resin portion 152 occur during cooling, or expansive or contractive forces are caused by temperature changes acting on the capacitors 260 after the second insulating resin portion 152 has been filled, the force acting at locations where the lead wires 264 and the second connecting terminals 254 are electrically joined is decreased by deforming of the lead wires 264. Thus, the electrical connections between the lead wires 264 of the capacitors 260 and the second connecting terminals 254 can be maintained.

With the several discussed embodiments according to the present invention, capacitors temporarily build up electromagnetic energy gathered in the coils 62 to prevent electromagnetic energy from suddenly being added between the first brush 80 and the segments 72, and thus discharge does not occur between the segments 72 and the first brush 80. Since the segments 72 and the first brush 80 do not suffer discharge wear, favorable electrical contact can be maintained between the segments 72 and the first brush 80.

According to the several discussed embodiments, in a cross section through the shaft 41 of the armature 40, a winding space formed by each of the bobbins 60 is formed as a trapezoid having a width that becomes narrower in a direction from the outer circumference portions 54 toward the center core 42. The armature 40 can be structured with almost no gap being formed between the coiled pole portions 50 that are mutually adjacent in the direction of rotation. Thus the space occupied by the armature 40 can be used efficiently with respect to the winding of coils around the bobbins 60. Thus, the number of coil windings can be increased.

Other Embodiments

According to the several discussed embodiments, the number of magnetic poles formed by the permanent magnets 30 is four, and the number of the coiled pole portions 50 is six, however, the number of poles formed by the permanent magnets 30 may be two, four, or any greater even number, and the number of the coiled pole portions 50 likewise may be any number other than six. Further, it is preferable that the number of coiled pole portions be more than the number of poles formed by the permanent magnets. It is further preferable that the number of the coiled pole portions be an even number two greater than the number of poles formed by the permanent magnets.

The embodiments of the present invention were discussed as if they were applied to a motor having a concentrated winding, however, the present invention is not limited thereto. For example, embodiments of the present invention may be applied to a motor having a distributed winding.

Further, according to the several discussed embodiments, a drawing force is generated to draw fuel from a fuel tank by rotation of the impeller 20 that serves as a rotating member of a pump. A gear, etc. may also be employed as the rotating member of the pump instead of an impeller. Furthermore, according to the several embodiments of the present invention, application is directed to a fuel pump, however, the present invention is not limited thereto. The present invention may be applied to various sorts of motors.

According to the several discussed embodiments, six or three capacitors are disposed extending between the segments 72, however, the number of capacitors is not limited in this manner as long as there is at least one.

According to the discussed third embodiment, the lead wires 264 of the capacitors 260 used in the second formed body 150 are flexible, however, according to the third embodiment of the present invention, capacitor terminals are disposed in an outer surface of the main capacitor bodies, and the capacitor terminals and the second connecting terminals 254 may be soldered together. Also, as long as capacitors with lead wires having flexibility serving as capacitor terminals are used, the insulating resin portion may be molded to support the segment base material, the commutator terminal base material, and the capacitors with an insulating resin portion, all at once without forming formed bodies separately for the segments and the capacitors, respectively.

Fourth Embodiment

Referring to FIGS. 2, 3, 4A, 4B, 5, 23A, 23B, 24, 25, 26A, 26B, 27, 28A, 28B, 29A, and 29B, a fourth embodiment of a motor and a fuel pump using the motor in accordance with the present invention is presented. FIG. 2 shows a fuel pump according to the invention. The fuel pump 10 is an in-tank style pump when installed, for example, within the fuel tank of a vehicle. The fuel pump 10 comprises a housing 12, and an inlet cover 14 and an outlet cover 19 which are secured in place by the housing 12 by means of calking.

A pump casing 16 is held between the inlet cover 14 and the housing 12. Between the inlet cover 14 and the pump casing 16 there is formed a C-shaped fluid channel 110 for the pump. The inlet cover 14 and the pump casing 16 are case members in which an impeller 20 is rotatably contained as a rotating member. The inlet cover 14, the pump casing 16, and the impeller 20 constitute a pump portion. Of the case members containing the impeller 20, the pump casing 16 is the member nearest to an armature 40. The pump casing 16 supports a first axle bearing 26 in an inner circumference thereof.

Several vane grooves are formed on the outer circumferential edge of the disk-shaped impeller 20. When the impeller 20 rotates together with a shaft 41 due to rotation of the armature 40, differential pressure occurs due to fluid friction before and after the vane grooves of the impeller 20, and by repetition thereof by the several vane grooves, fuel inside the fluid channel 110 receives pressure. Fuel in a fuel tank (not shown) is first drawn by the rotation of the impeller 20 into the fluid channel 110 from a fuel inlet (not shown) formed in the inlet cover 14, and is eventually discharged from a connecting passage (not shown) of the pump casing 16 near a cover 90 disposed at one axial end of the armature 40. The fuel continues by passing along an outer circumference of the armature 40 toward a commutator 70, and finally passes through a fuel outlet (not shown) to be output from the fuel pump 10 onward toward an engine (not shown).

A permanent magnet 30 formed in four arc-shaped pieces, each piece being quarter arc shaped, is attached circumferentially to an inner circumference of the housing 12. The permanent magnet 30 is formed into four pieces having magnetic poles of differing polarity following in the direction of rotation. The four pieces of permanent magnet 30 are held in place by a resin portion 38.

At the other axial end of the armature 40 opposite to the cover 90 the commutator 70 is attached, and the axial end of the armature 40 opposite to the commutator 70 is covered by the cover 90. The permanent magnet 30, the armature 40, the commutator 70, and brushes (not shown) constitute a DC motor. The shaft 41, which is the rotating axle of the armature 40, is rotatably supported by the first axle bearing 26 and a second axle bearing 27 contained and supported respectively by the pump casing 16 and the outlet cover 19.

As shown in FIG. 3, the armature 40 comprises a center core 42 in the central rotating portion thereof. The shaft 41 is press fitted into the center core 42. The center core 42 is formed in a tubular hexagon shape in cross section, and comprises depressed portions 44 extending axially at the six outer circumferential faces thereof. A width of the depressed portions 44 gradually decreases in the radial direction the shorter the distance is to the outer circumferential faces.

Six coiled pole portions 50 are disposed in the direction of rotation on the outer circumference of center core 42. Each of coiled pole portions 50 comprises coil cores 52, bobbins 60, and coils 62 formed by concentrated winding around bobbins 60. Since all six of coiled pole portions 50 are of the same structure, reference numbers are partially omitted in FIG. 3.

As shown in FIG. 4A, the coil cores 52 are members separate from the center core 42. Referring to FIG. 3, the coil core 52 comprises an outer circumference portion 54 which faces the permanent magnet 30 along the direction of rotation, and a coil winding portion 56 which is plate-shaped and extends from the outer circumference portion 54 toward the center core 42. Each of the coil cores 52 is thus formed in a T-shape viewed in a cross-section perpendicular to the shaft 41 of the armature 40. A peripheral face 55 of the outer circumference portion 54 is formed to have a smooth arc shape. The size of a clearance formed along the rotational direction by the peripheral face 55 of the outer circumference portion 54 and the inner peripheral face 31 of the permanent magnet 30 is uniform. The coil winding portion 56 comprises a raised portion 58 extending toward the rotational shaft at a portion thereof nearest the center core 42. The width of the raised portion 58 increases gradually in the radial direction toward the center core 42. The depressed portions 44 and the raised portions 58 are mated together by inserting the raised portions 58 into the depressed portions 44 along the axial direction, respectively.

The bobbin 60 covers the coil core 52 excepting the peripheral face 55 of the outer circumferential portion 54 and the raised portion 58. The bobbin 60 magnetically insulates the outer circumferential portions 54 of the coil cores 52 which are mutually adjacent in the direction of rotation. In cross-sections through and including the shaft 41, the bobbin 60 sandwiches the coil winding portion 56 and forms a trapezoid winding space whose width decreases in the direction from the outer circumferential portion 54 toward the center core 42. The coil 62 is formed by winding coils in this winding space.

With reference to FIG. 2, an end of each of the coils 62 near the commutator 70 is electrically connected to the first terminal 64. The first terminals 64 are fitted and electrically connected to second terminals 74 and claws 74a of connector terminals 77 near the commutator 70. Ends of the coils 62 near the impeller 20, opposite to the commutator 70, are electrically connected to third terminals 66. The third terminals 66 are successively adjacent three terminals one after the other in the direction of rotation and are electrically connected by fourth terminals 68.

The commutator 70 is cartridge-style and formed as a single body. With the shaft 41 being press fitted into the center core 42, the shaft 41 is inserted into bore 71 of the commutator 70 to attach the commutator 70 to the armature 40, at which time each of the claws 74a, which project from the commutator 70 toward the armature 40, respectively fit with the first terminals 64 of the armature 40 to be electrically connected thereto. A first C ring 100 is press fitted onto the shaft 41 to prevent the commutator 70 from detaching from the shaft 41. The commutator 70 comprises six segments 72 disposed in the rotational direction. The segments 72 are formed, for example, from carbon, and they are mutually electrically insulated by an air-gap or by an insulating resin portion 76.

Figure 23A:
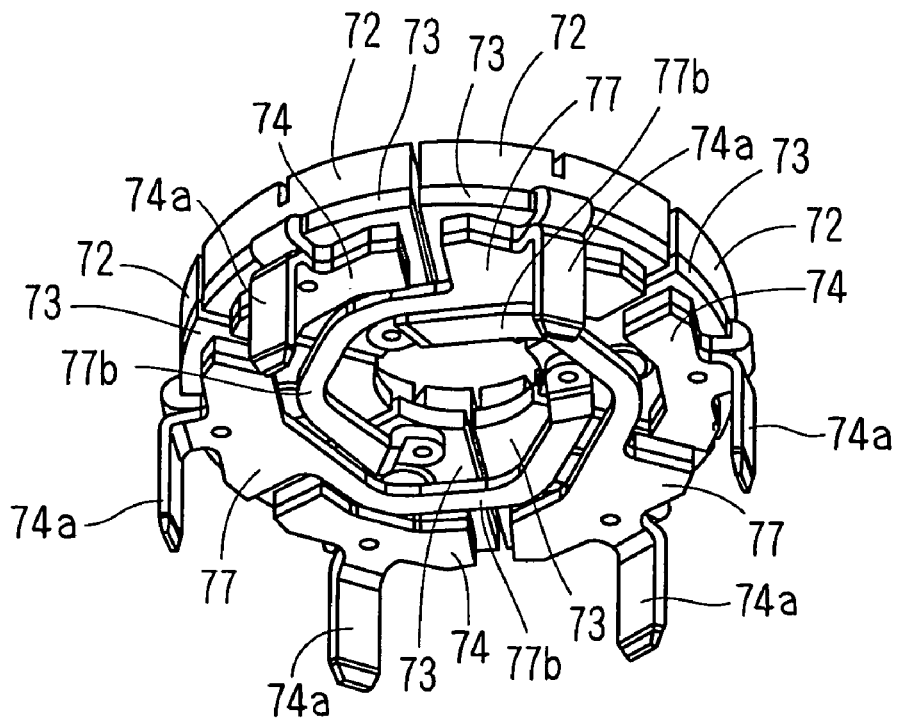
FIG. 23A is a perspective view of a commutator viewed from an armature side with an insulating resin portion detached according to a fourth embodiment of the present invention.

Mid-terminals 73 are in direct electrical connection to the segments 72. Each of the segments 72 is electrically connected to the second terminals 74 and the connector terminals 77 through the mid-terminals 73. The connector terminals 77 are distanced from the respective surfaces of the segments 72 nearest the armature 40, and as shown in FIG. 23A, connector extensions 77b of the connector terminals 77 electrically connect the mid-terminals 73 pairs of the segments 72 which are radially opposed. Thus, the segments 72 positioned radially opposite to one another have the same potential. Connection terminals are formed in a plate shape by the mid-terminals 73 acting as connecting portions and the connector terminals 77 acting as wiring portions. The wiring portions of the connection terminals which connect the segments 72 of the same potential excepting the claws 74a of the connector terminals 77 are disposed in substantially the same plane. Referring to FIG. 2, an insulating resin portion 76 is molded around the segments 72 (excepting brush-contacting surfaces), the mid-terminals 73, the second terminals 74, and the connector terminals 77 (excepting extremities) through insert molding. Power passes through a fifth terminal 79 press fitted into the outlet cover 19, the brushes, the segments 72, the mid-terminals 73, the second terminals 74, and the connector terminals 77 to be supplied to the coils 62 of the armature 40. By the commutator 70 rotating together with the armature 40, each of the segments 72 successively contacts the brushes.

Figure 24:
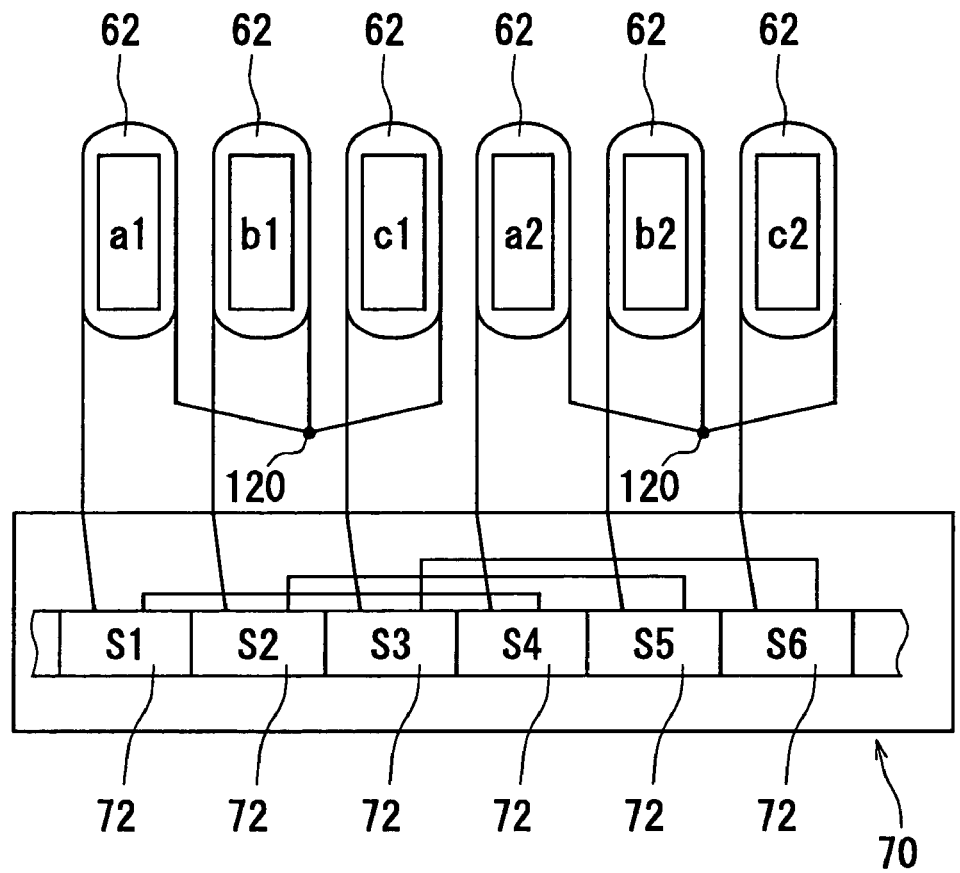
FIG. 24 is a schematic diagram showing connections of coils and capacitors according to the fourth embodiment.
Figure 25:
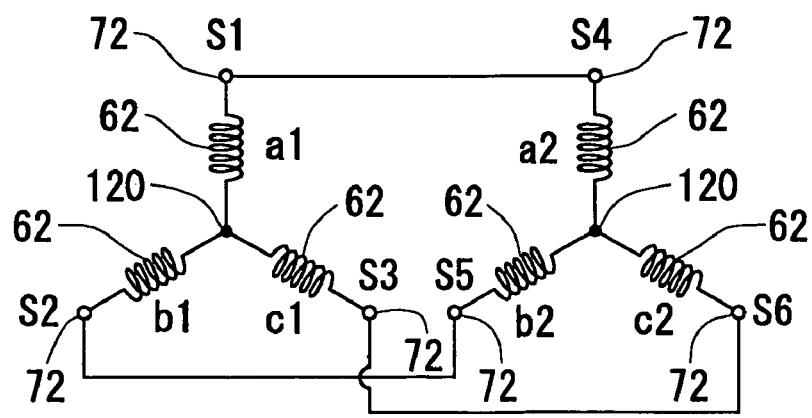
FIG. 25 is a circuit diagram showing connections of coils and capacitors according to the fourth embodiment.

With reference to FIG. 24, a segment S1 and a segment S4 as a pair, and likewise a segment S2 and a segment S5, and a segment S3 and a segment S6 of the commutator 70 are electrically connected and have the same potential, owing to the joining of the segments 72, the mid-terminals 73, and the connector terminals 77 as has been explained. In FIG. 24, a1, b1, c1, a2, b2, and c2 represent the coils 62 disposed on the armature 40 in this order in the direction of rotation, and S1, S2, S3, S4, S5, and S6 represent the segments 72 disposed in the commutator 70 in this order in the direction of rotation.

The ends of the coils 62 near the commutator 70 and the segments 72 are electrically connected, as are the ends of the coils 62 opposite to the commutator 70 to each other. The ends of the coils 62 opposite to the commutator 70 form neutral point 120 of a star connection. That is, referring to FIG. 25, three of the coils 62 are connected in parallel through a star connection.

Referring to FIG. 2, the cover 90 covers the axial end of the armature 40 opposite to the commutator 70, such that resistance of the armature 40 rotating in fuel is decreased. The cover 90 comprises a large depression portion 92 in a central portion thereof surrounding the shaft 41. A portion of both the first axle bearing 26 and the pump casing 16 are disposed within the large depression portion 92. A second C ring 102 is press fitted onto the shaft 41 to prevent the cover 90 from detaching from the shaft 41.

Figure 23B:
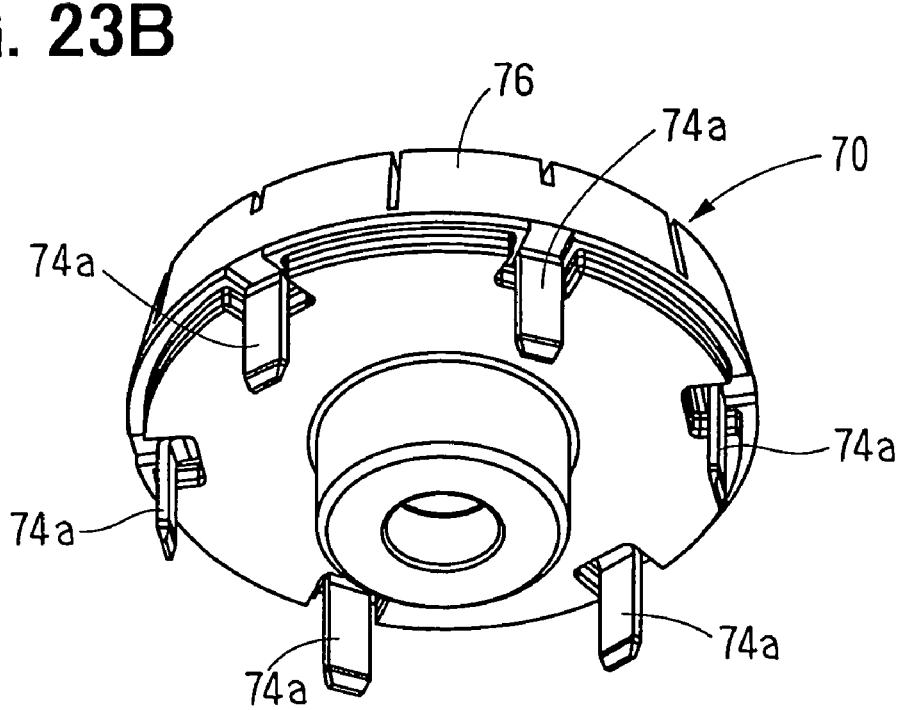
FIG. 23B is a perspective view of the commutator of FIG. 23A as viewed from the armature side after molding of a insulating resin portion.

The structure of the mid-terminals 73, the second terminals 74, and the connector terminals 77 constituting the commutator 70 will now be explained with reference to FIGS. 5, 23A, 23B, 26A, and 26B. FIG. 23A shows the commutator 70 without insulating resin portion 80, and FIG. 23B shows the commutator 70 after the insulating resin portion 80 has been molded thereto.

As shown in FIG. 23A, the mid-terminals 73 are held between the second terminals 74 and the connector terminals 77 on one side and the segments 72 on the other, and both the second terminals 74 and the connector terminals 77 are electrically connected to the segments 72 through the mid-terminals 73. The mid-terminals 73 are disposed at the portion of the segments 72 nearest the armature 40, and are in direct electrical connection to the segments 72. Referring to FIG. 5, the mid-terminals 73 comprise thin portions 75 at an inner circumference thereof and thick portions 74 at an outer circumference thereof. The thickness of thin portions 75 is less than that of thick portions 74, and due to this difference, a stepped portion is formed on the side of the mid-terminals 73 away from the segments 72. The second terminals 74 and the connector terminals 77 are alternatingly disposed in the direction of rotation on the side of the mid-terminals 73 away from the segments 72, and are electrically connected to the mid-terminals 73.

Figure 26A:
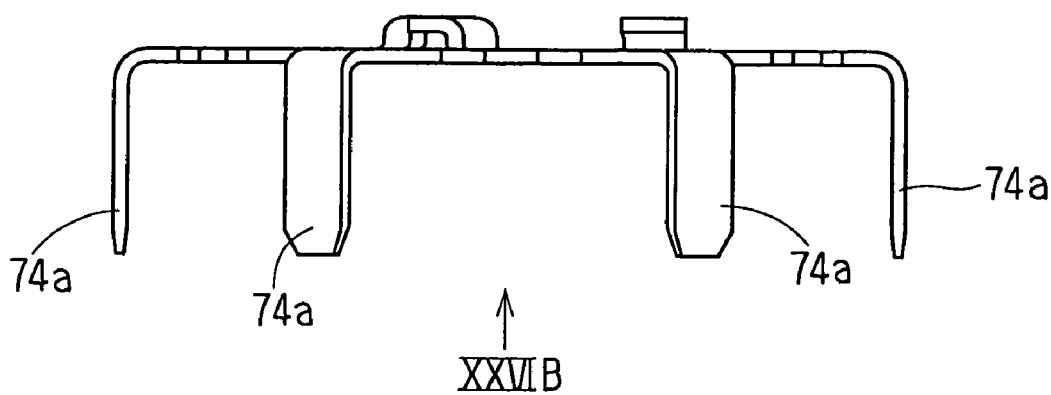
FIG. 26A is an elevation view of connector terminals according to the fourth embodiment.
Figure 26B:
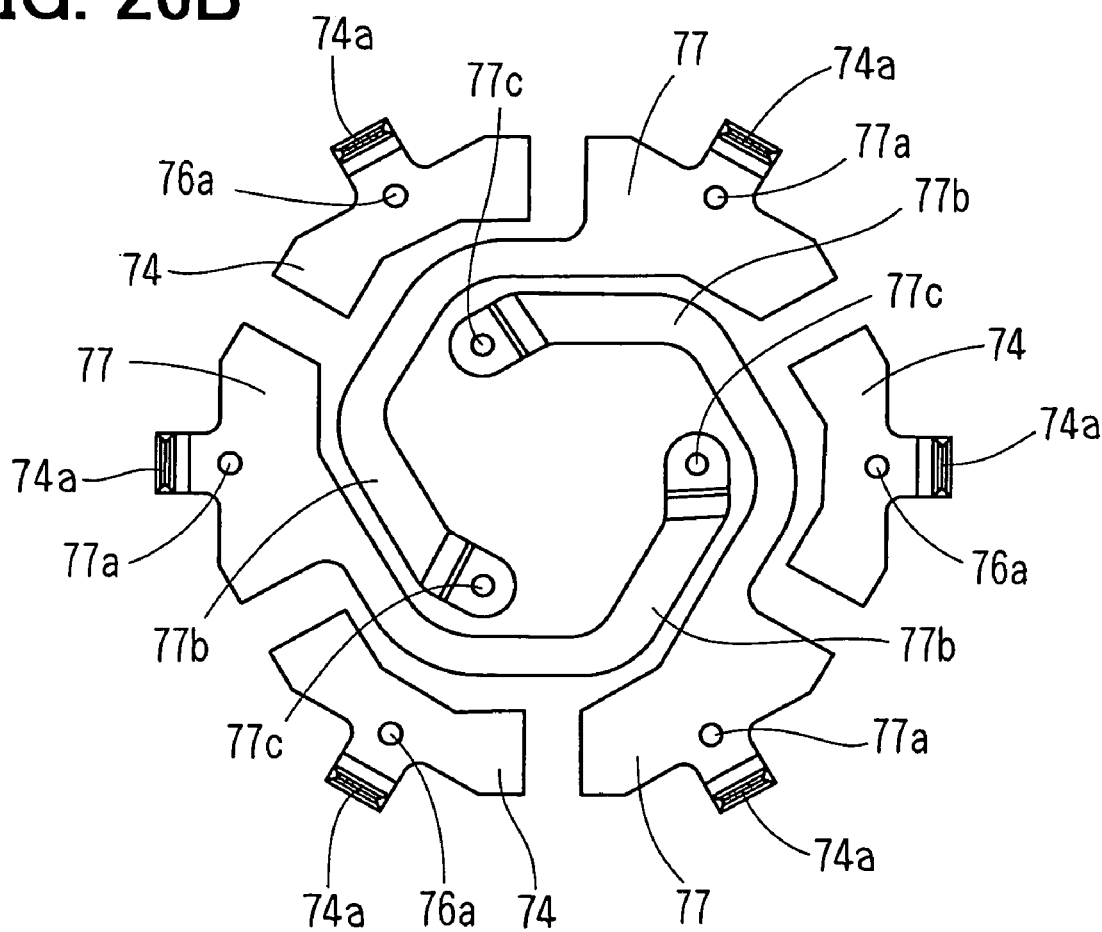
FIG. 26B is a perspective view of the connector terminals of FIG. 24A shown in the direction of arrow XXVIB in FIG. 26A.
Figure 27:
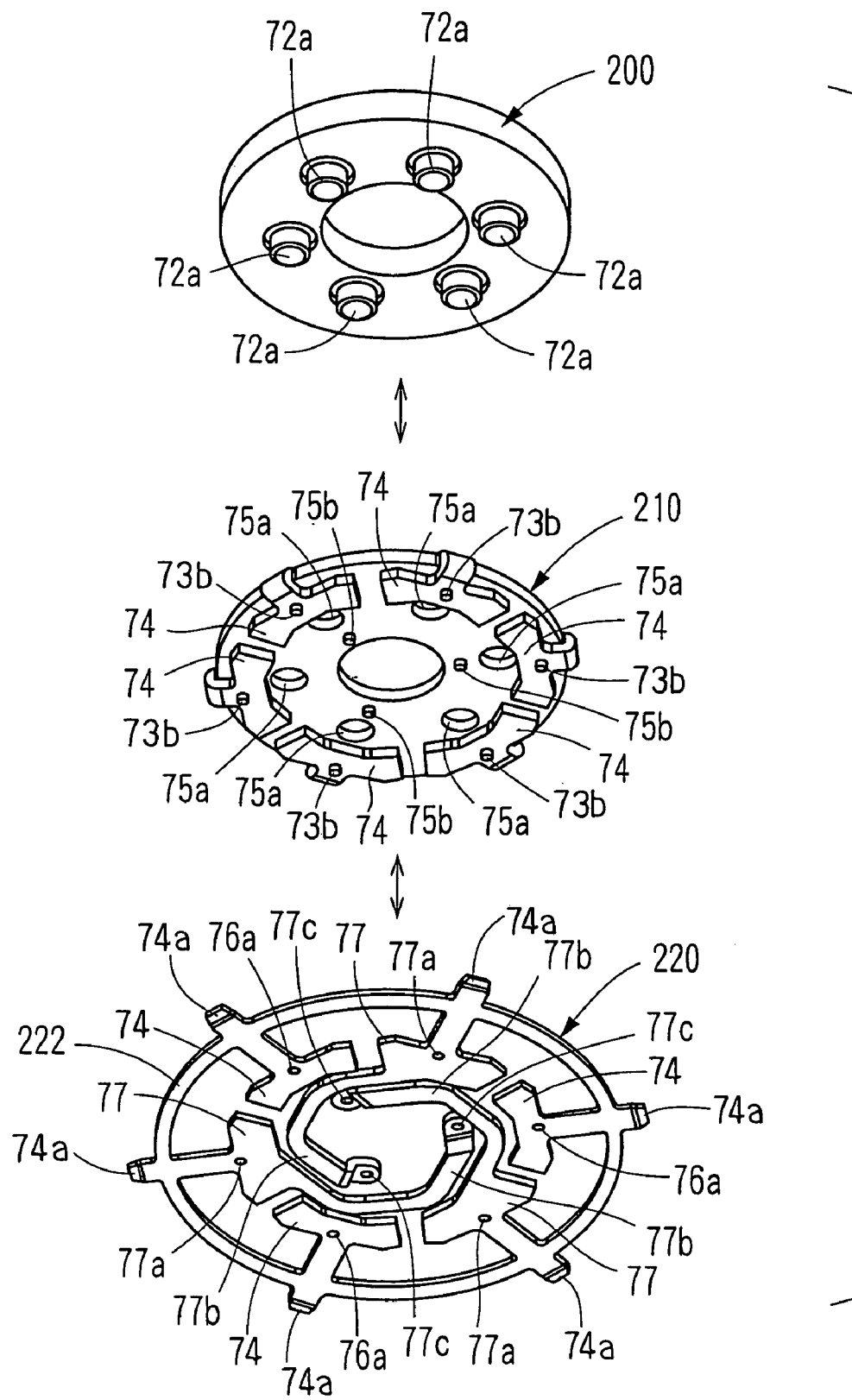
FIG. 27 is an exploded perspective view showing the fabrication process assembly of the commutator according to the fourth embodiment.

Referring to FIG. 26B, the second terminals 74 and the connector terminals 77 are disposed substantially in the same plane, and comprise the claws 74a which are fitted to the first terminals 64 of the armature 40. Connector terminals 77 comprise the arc-shaped connector extensions 77b extending respectively in the same rotational direction. The connector extensions 77b are disposed in a spiraling pattern, which are three in number. Extreme ends of the connector extensions 77b project toward the mid-terminals 73 as can be seen in FIG. 26A. Each of the connector extensions 77b is electrically connected at one end thereof to one of the thick portions of the mid-terminals 73. Each of the connector extensions 77b, while avoiding mutual contact, then continues therefrom as an extending portion along the inner circumference of second terminals 74 which are of differing potential as well as disposed near the extending portions of connector extensions 77b. Each of the extending portions also passes along the thin portions 75 of the mid-terminals 73 of differing potential while avoiding contact therewith, and finally terminates in another end of the connector extension 77b which is electrically connected to one of the thin portions 75 of the mid-terminals 73 which is radially opposite. Thus, a pair of the segments 72 which are facing and are radially opposite are electrically connected by the connector terminals 77, and have the same potential. According to the fourth embodiment, the difference in thickness of the mid-terminals 73, as well as the connector extensions 77b of the connector terminals 77 acting as wiring portions disposed in a spiral shape constitute an avoiding non-contact structure of the connection terminals.

FIG. 5 is an exploded view of commutator 70 with insulating resin portion 80 shown in FIG. 23A detached therefrom showing each member. Large projections 72a are formed on the segments 72. The large projections 72a fit with large fitting holes 73a formed in the mid-terminal 73 to join the segments 72 and the mid-terminal 73. On each of the mid-terminals 73 are formed first small projections 74a at the combined outer circumference thereof to encircle the large fitting holes 75a. On the thin portions 75 of the mid-terminals 73, which joins to the extreme ends of the connector extensions 77b, are formed second small projections 75b within the inner circumference of the large fitting holes 75a. Second terminal fitting holes 76a and first fitting holes 77a are formed respectively at portions of the second terminal 74 and the connector terminals 77 respectively near the claws 74a, and at the extreme ends of the connector extensions 77b are formed second fitting holes 77c. The mid-terminals 73 are joined to the second terminals 74 and to the connector terminals 77 by the first small projections 74a fitting with the second terminal fitting holes 76a and with the first fitting holes 77a, and the second small projections 75b fitting with the second fitting holes 77c.

Next, the production method of the commutator 70 will be explained while referring to FIGS. 27 to 29B. A first base material 200 is first formed for segments 72, a second base material 210 for mid-terminals 73, and a third base material 220 for second terminals 74 and connector terminals 77. The base materials 200, 210, and 220 are shown as they appear before being divided per each of segments 72.

The thick portions 74 of the mid-terminals 73 are pre-divided per each of the segments 72 while the thin portions 75 of the mid-terminals 73 remain joined in the circumferential direction with the second base material 210 still in an unprocessed state. The second terminals 74 and the connector terminals 77 to be formed from the third base material 220 are mutually joined at respective claws 74a thereof by a circular frame 222 without the claws 74a being bent.

Figure 28A:
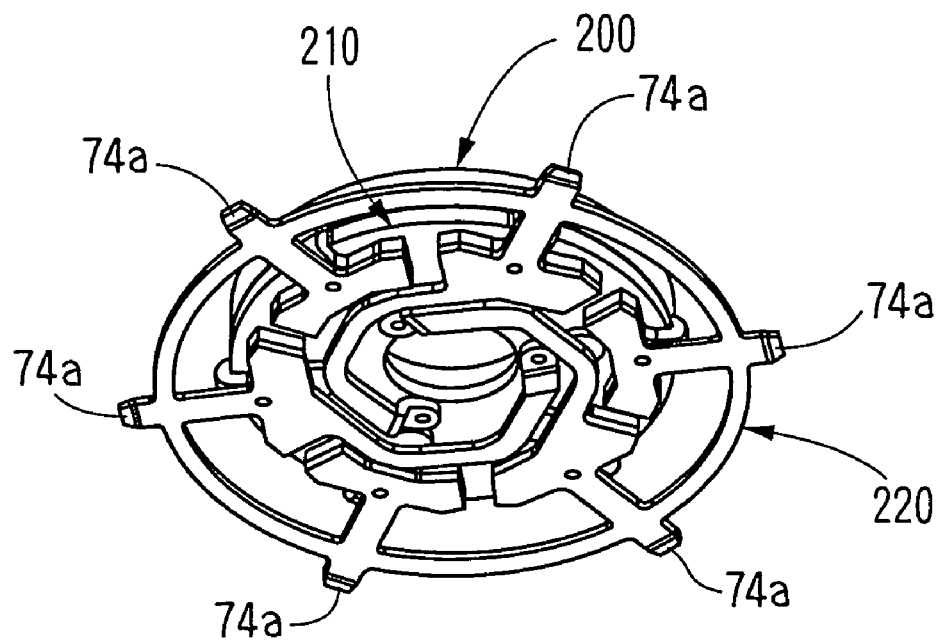
FIG. 28A is a perspective view showing the fabrication process of the commutator of FIG. 27.
Figure 28B:
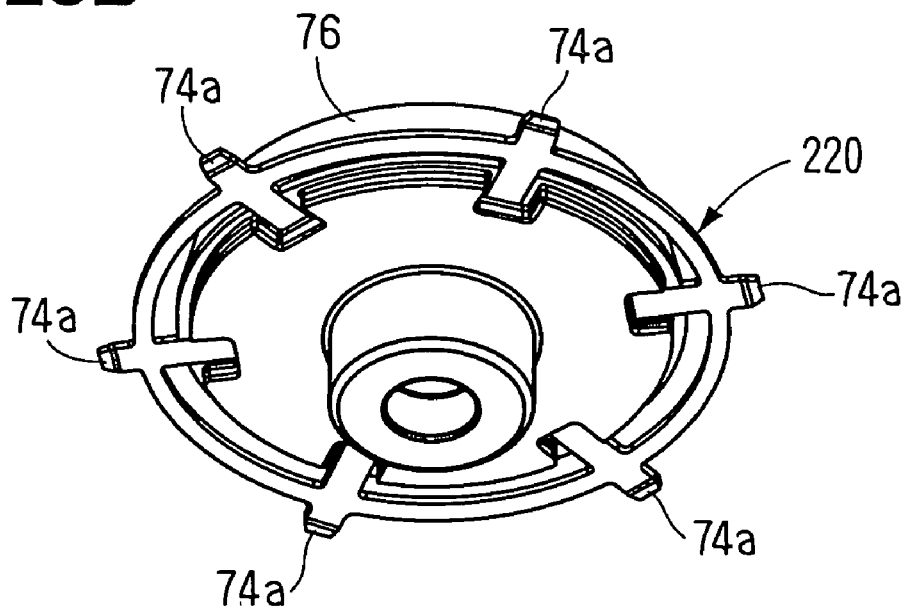
FIG. 28B is a perspective view showing the fabrication process of the commutator of FIG. 27.

Referring to FIG. 28A, the base materials 200, 210, and 220 are then joined together by the fitting of the large projections 72a into the large fitting holes 75a, the first small projections 74a into both the second terminal fitting holes 76a and the first fitting holes 77a, and the second small projections 75b into the second fitting holes 77c. Insulating resin portion 76 is then molded around the joined base materials 200, 210, and 220 through insert molding as shown in FIG. 28B.

Figure 29A:
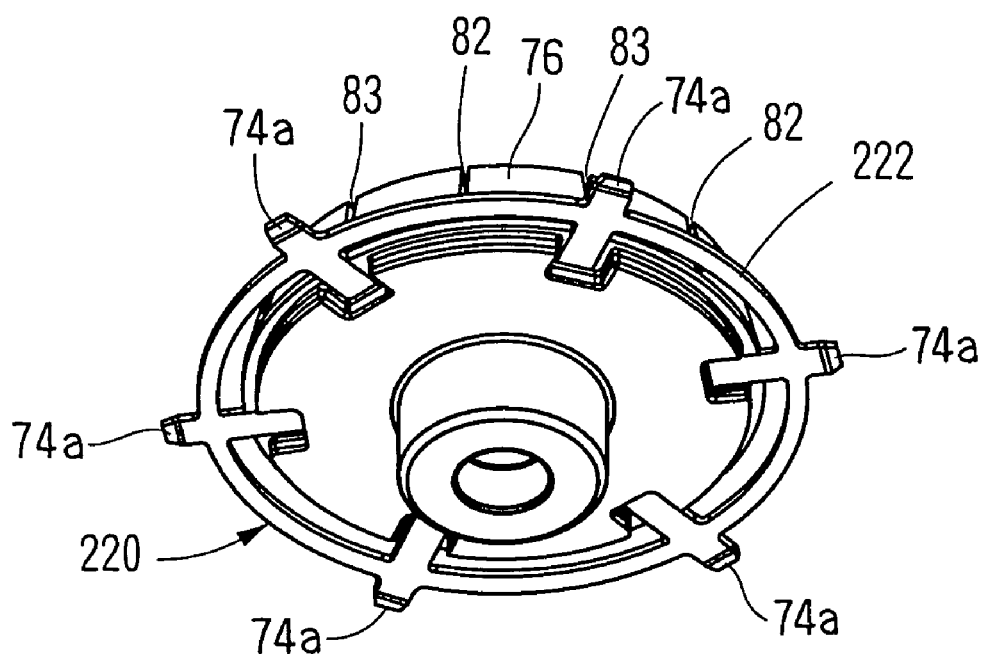
FIG. 29A is a perspective view showing the fabrication process of the commutator of FIG. 27.
Figure 29B:
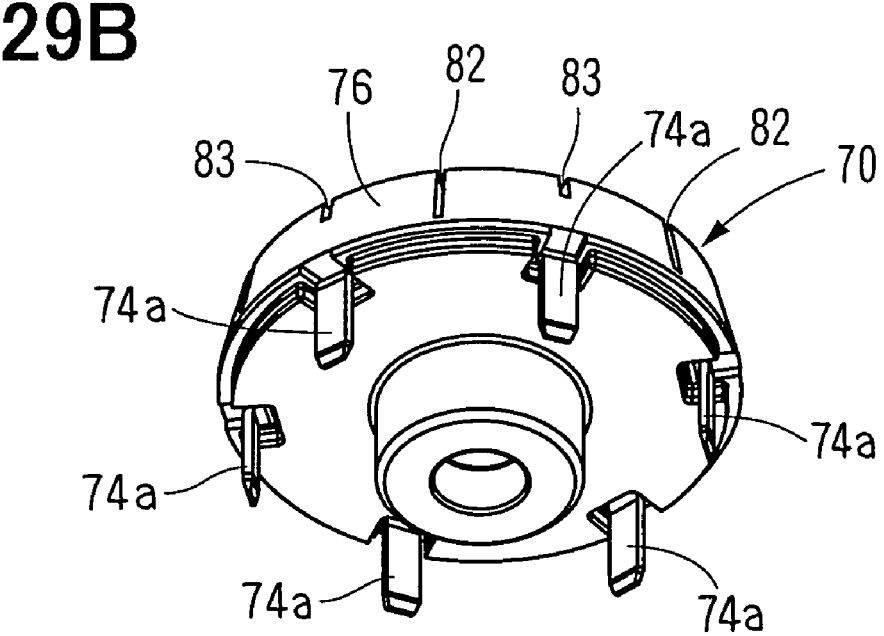
FIG. 29B is a perspective view showing the fabrication process of the commutator of FIG. 27.

As shown in FIG. 29A, slits 82 are formed starting from a surface of the first base material 200 which will contact with brushes as far as the thin portions 75 of the mid-terminals 73, and division per each of the segments 72 is performed. Shallow grooves 83 are formed per each segment 72 for draining oil film from brush-contacting surfaces. Referring to FIG. 29B, after the formation of the slits 82 and the shallow grooves 83, fabrication of the commutator 70 is completed by cutting away the circular frame 222 and bending the claws 74a.

Fifth Embodiment

A fifth embodiment according to the present invention will now be discussed with reference to FIGS. 30 to 32C. Reference numbers are maintained for elements and portions thereof which are substantially the same as in the fourth embodiment.

Figure 30:
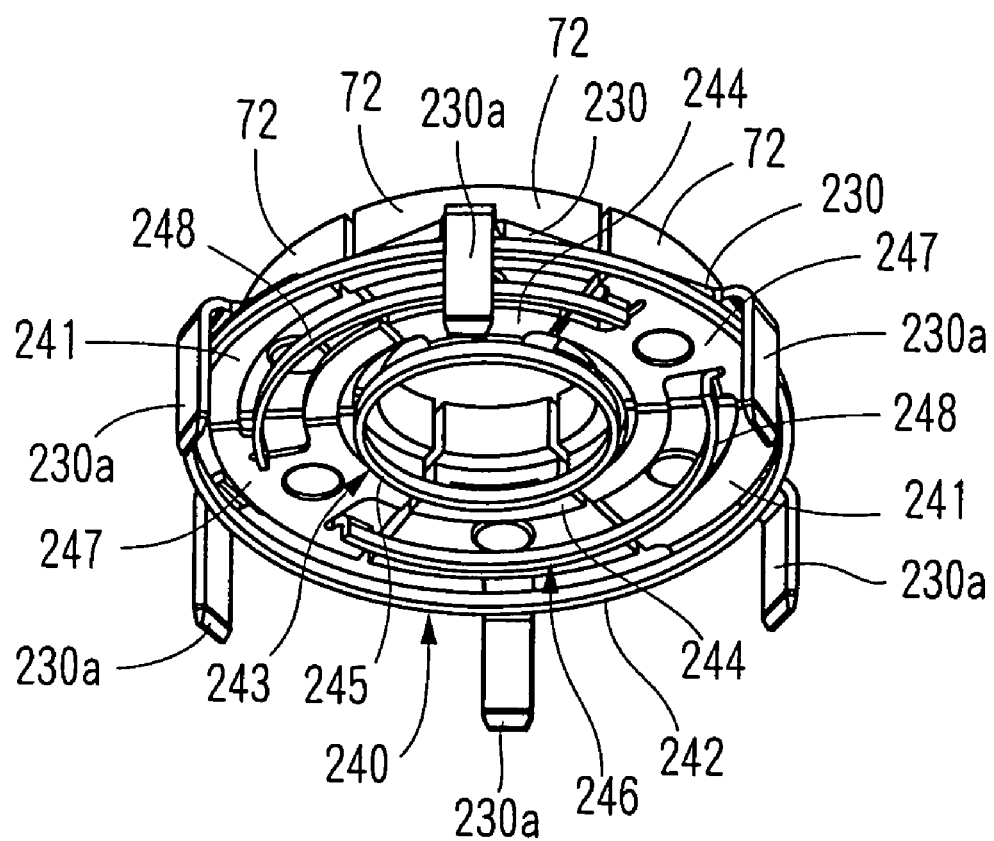
FIG. 30 is a perspective view of a commutator with its insulating resin portion detached, as viewed from an armature side, according to a fifth embodiment of the present invention.
Figure 31:
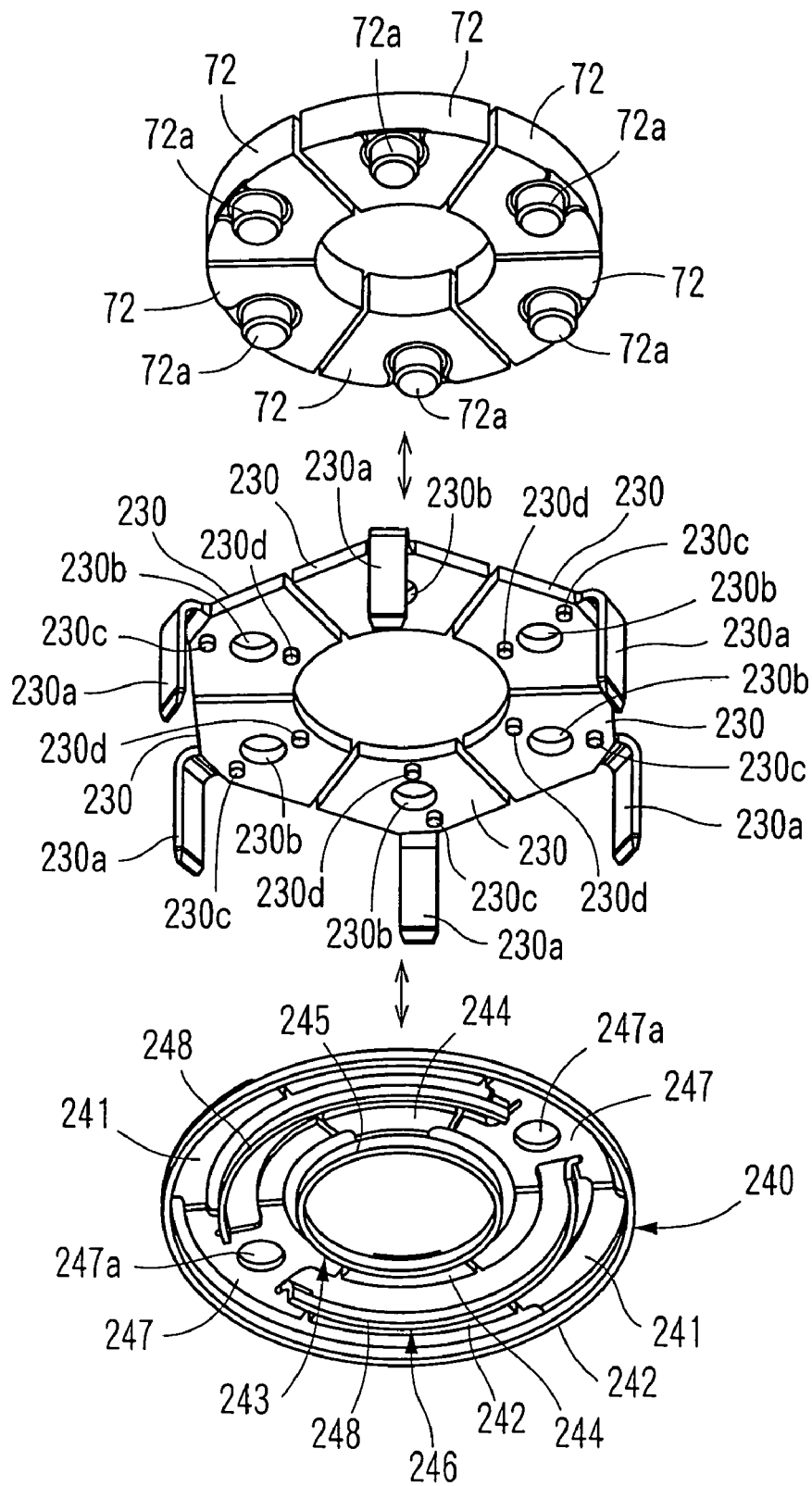
FIG. 31 is an exploded perspective view showing the commutator of FIG. 30, including the segments, mid-terminals, and connector terminals.
Figure 32A:
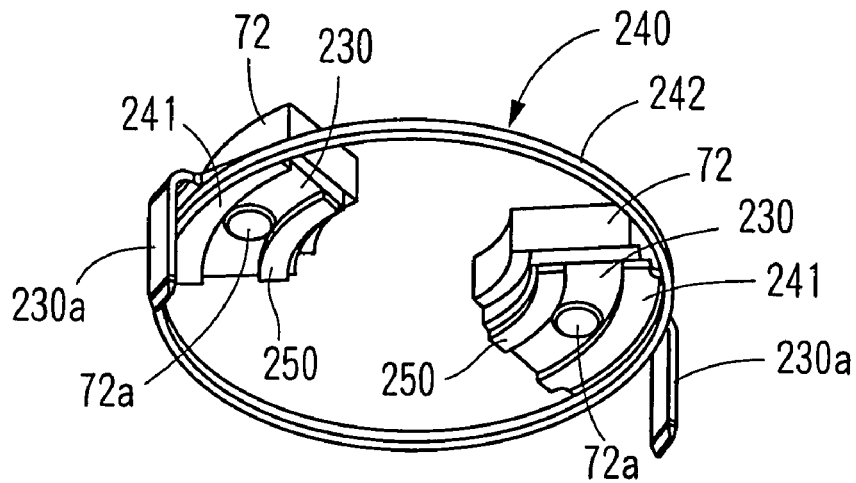
FIGS. 32A, 32B, and 32C are perspective views showing respective pairs of the segments, the mid-terminals, and the connector terminals of the same potential of FIG. 30.
Figure 32B:
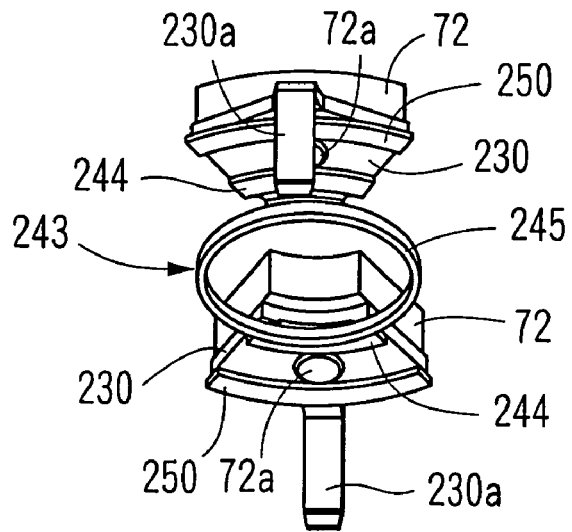
Figure 32C:
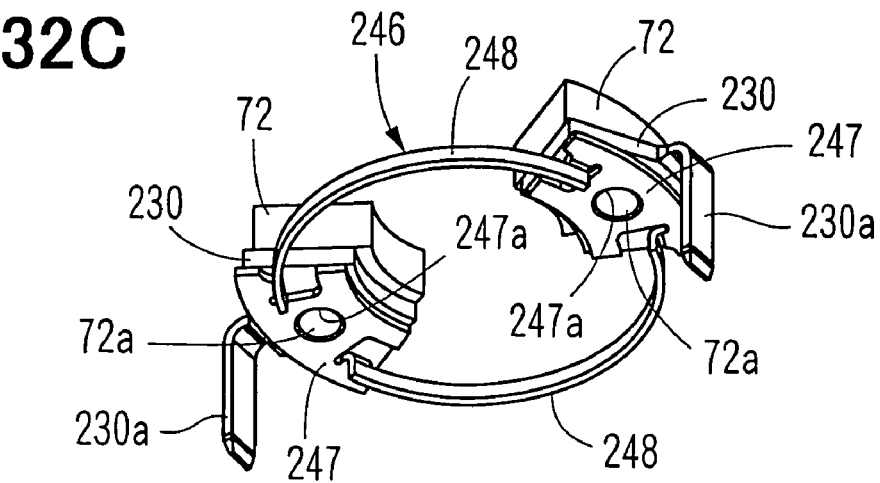

A commutator is shown without an insulating resin portion in FIG. 30, and mid-terminals 230 as well as connector terminals 240, 243, and 246 are divided per each of segments 72. The mid-terminals 230 are held between the connector terminals 240, 243, and 246 and the segments 72. Connection terminals comprise mid-terminals 230 as connecting portions and connector terminals 240, 243, and 246 as wiring portions. Wiring portions of the connection terminals which connect pairs of segments 72 having the same potential are disposed in substantially the same plane excepting claws 230a of the mid-terminals 230. FIG. 31 shows the assembly in FIG. 30 as an exploded view, the assembly including the segments 72, the mid-terminals 230, and the connector terminals 240, 243, and 246. FIGS. 32A–32C show another exploded view of the assembly in FIG. 30, showing paired segments 72 of the same potential.

Referring to FIG. 31, the mid-terminals 230 are formed having the same thickness, and comprise the claws 230a which join with the first terminals 64 near the armature 40. On the mid-terminals 230 are formed large fitting holes 230b for fitting with large projections 72a of the segments 72, as well as first small projections 230c and second small projections 230d for fitting with fitting holes (not shown) of the connector terminals 240, 243, and 246.

With reference to FIG. 32C, first large fitting holes 247a for fitting with the large projections 72a of the segments 72 are formed on the connector terminal 240 at the same locations as the second large fitting holes 230b of the mid-terminals 230. It can be seen from FIGS. 14A and 14B that a member does not exist at locations of the connector terminals 243 and 246 corresponding to the large projections 72a. Frame portions 250 located at an inner circumference of the first contact terminals 241 and at an outer circumference of the second contact terminals 244 are remnants of a frame which had joined the connector terminals 240, 243, and 246 together before division per each of the segments 72.

The connector terminals 240, 243, and 246 are respectively formed as a single body in a ring shape, and are distanced from the surface of the segments 72 nearest the armature 40. The connector terminals 240, 243, and 246 respectively comprise first contact terminals 241, second contact terminals 244, and third contact terminals 247 which respectively comprise radially opposed portions, and annular terminals 242, 245, and 248 which are concentrically disposed and respectively join the contact terminals 241, 244, and 247. The contact terminals 241, 244, and 247 are electrically connected to the mid-terminals 230 which are electrically connected to pairs of the segments 72 of the same potential. The ring terminals 242, 245, and 248 are each distanced from the contact terminals of the other connection terminals differing in potential in the direction toward the armature 40. According to the fifth embodiment, concentrically disposed ring terminals 242, 245, and 248 constitute an avoiding non-contact structure of the connection terminals.

According to the thus explained several embodiments of the present invention, the connection terminals comprising the mid-terminals and the connector terminals are disposed in substantially the same plane, such that the axial length of the wiring portions which electrically connects the segments 72 of the same potential is shortened. Thus, the axial length of a motor can be shortened. By also forming the connection terminals which electrically connect the segments 72 of the same potential from the mid-terminals and the connector terminals which are separate members, the structure of the mid-terminals and the connector terminals constituting the connection terminals is simplified, and manufacturing is facilitated. The segments are joined with the mid-terminals, as well as the mid-terminals with the connector terminals, by the fitting of projections into fitting holes to provide electrical connection. Thus, compared to an instance of connecting segments of the same potential together with wire, fabrication with respect to connecting is facilitated.

Also according to the present embodiment, the connection terminals comprising the mid-terminals and the connector terminals may be formed from a common base material. Segments maybe formed from copper, etc. or other metal, besides from carbon.

According to the several discussed embodiments, in a cross-section of the armature 40 orthogonal to the shaft 41, the winding space formed by the bobbin 60 is formed in a trapezoidal shape having a width which decreases in the direction from the outer circumference portions 54 toward the center core 42. Since the armature 40 can be structured with almost no formation of a gap between coiled pole portions 50 mutually adjacent in the direction of rotation, the space occupied by the armature 40 can be used effectively, and coils can be wound around the bobbin 60. Thus, the number of windings can be increased.

Also according to the several discussed embodiments, the number of magnetic poles formed by the permanent magnets 30 were four, and the number of the coiled pole portions 50 were six, however, the number of magnetic poles may be two, four, or any even number of poles; likewise, there can be any number of coiled pole portions. It is preferable that the number of coiled pole portions be larger than the number of magnetic poles formed by permanent magnets. Further, it is preferable that the number of coiled pole portions be an even number and two greater than the number of magnetic poles formed by permanent magnets.

According to the previous several embodiments, the present invention was discussed regarding embodiments applied to a concentrated winding motor, however, the invention is not limited in this manner, and may, for example, be applied to a motor with distributed winding.

According to the previously discussed embodiments, drawing power to draw fuel from a fuel tank is produced by the rotation of the impeller 20 acting as the rotating member of fuel pump. However, other types of pump, such as a gear pump, may be employed as the rotating member of fuel pump 10. Also according to the previously discussed embodiments, the present invention was discussed referring to embodiments applied to a fuel pump, however, the invention is not limited in this manner, and therefore may be applied to various motors.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A motor for a fuel pump, comprising:
   a permanent magnet formed from a plurality of magnetically differing poles disposed in an alternating and circumferential fashion;
   an armature rotatingly disposed within an inner circumference of the permanent magnet, the armature having coils wound thereabout; and
   a commutator comprising a plurality of segments disposed in a direction of rotation and electrically connected to the coils wound around the armature, the segments mutually adjacent in the direction of rotation and being mutually insulated;
   a brush successively contacting each of the segments due to rotation of the armature; and
   a capacitor electrically connected to a circuit including the commutator and the armature, wherein the capacitor stores electromagnetic energy released by the coils during rotation of the armature to prevent occurrence of discharge between the brush and the segments, wherein the commutator and the armature comprise a rotating member, wherein the capacitor is disposed inside the rotating member so as not to be disposed on a peripheral surface of the rotating member, and wherein a recessed portion is formed between adjacent coils in the armature and between the coils and the commutator in an axial direction of the armature, and the capacitor is disposed so as to project on a side of the commutator nearest the armature and is disposed in a position corresponding to the recessed portion, whereby an axial length of the motor can be shortened.

2. The motor according to claim 1, further comprising:
   a center core; and
   and outer core, wherein the center core and the outer core are joined by a joint such that when successive outer cores are joined to the center core, the coil, when wound, forms a trapezoidal shape.

3. The motor according to claim 1, wherein electric current from the coils flows to the brush via the segments when the segments and the brush are in contact, and the electromagnetic energy discharged by the coils is temporarily built up by the capacitor when the brush separates from the segments.

4. The motor according to claim 1, wherein the capacitor is disposed in the commutator.

5. The motor according to claim 4, wherein the commutator comprises a plurality of terminals electrically connected to the respective segments, the capacitor being electrically connected directly to at least two of the terminals adjacent in the direction of rotation.

6. The motor according to claim 1, wherein the number of the segments is even and pairs of the terminals located radially opposite are directly electrically connected.

7. The motor according to claim 1, wherein the segments and the capacitor are joined by insert molding an insulating resin portion.

8. The motor according to claim 1, wherein the armature comprises:
   a plurality of armature pieces disposed in the direction of rotation,
   a plurality of coils wound around the respective armature pieces, and
   a plurality of coil terminals corresponding to the respective coils,
   the capacitor being disposed so as to be located between the coil terminals.

9. The motor according to claim 1, wherein the armature comprises a plurality of bobbins disposed in the direction of rotation, coils being formed by winding of coil around each of the bobbins.

10. The motor according to claim 1, wherein the coils wound around the armature are joined together with a star connection.

11. The motor according to claim 1, whereby the following expression is satisfied, where O is a rated output of the motor [W], P is the number of pole pairs of the permanent magnet, and C is the total electrostatic capacity of the capacitors [µF]:

$$0.02*O*P<C<0.2*O*P.$$

12. A fuel pump employing a motor according to claim 1, the fuel pump further comprising:
   a pump portion that generates a drawing force to draw fuel from a fuel tank due to a rotational driving force of the armature.

13. The motor according to claim 1, wherein the commutator and the capacitor are formed into a single, integrated body with molded resin.

14. The motor according to claim 1, wherein the capacitor is disposed adjacent a surface of the commutator on a side opposite to a contacting surface of the commutator which contacts with the brushes.

15. A commutator for a fuel pump rotating together with an armature and converting electric current supplied to coils wound around the armature, the commutator comprising:
   a plurality of segments electrically connected to the coils and contacting brushes accompanying rotation of the armature, the segments being disposed in a direction of rotation, pairs of the segments adjacent in the direction of rotation being mutually and electrically insulated; and a capacitor electrically connected to the segments, temporarily building up electromagnetic energy discharged by the coils accompanying rotation of the armature, wherein the capacitor is disposed adjacent a surface of at least one said segment on a side opposite to a contacting surface thereof which contacts with the brushes, and wherein a recessed portion is formed between adjacent coils in the armature and between the coils and the commutator in an axial direction of the armature, and the capacitor is disposed so as to project on a side of the commutator nearest the armature and is disposed in a position corresponding to the recessed portion, whereby an axial length of the motor can be shortened.

16. The commutator according to claim 15, further comprising:

a plurality of commutator terminals electrically connected to the respective segments, the capacitor being electrically connected directly to at least two of the commutator terminals adjacent in the direction of rotation, the capacitor further comprising:

a main capacitor body; and a flexible terminal extending from the main capacitor body.

17. The commutator according to claim 16, further comprising:

a plurality of commutator terminals electrically connected to the respective segments, the capacitor being electrically connected directly to at least two of the commutator terminals adjacent in the direction of rotation, the commutator terminals having first terminals electrically connected directly to the respective segments and second terminals electrically connected directly to the capacitors.

* * * * *

UNITED STATES PATENT AND TRADEMARK OFFICE
CERTIFICATE OF CORRECTION

PATENT NO. : 7,084,547 B2  Page 1 of 1
APPLICATION NO. : 10/761465
DATED : August 1, 2006
INVENTOR(S) : Moroto et al.

It is certified that error appears in the above-identified patent and that said Letters Patent is hereby corrected as shown below:

On the Title Page::
Item
"(75) Inventors: Kiyonori Moroto Kariya (JP); Motoya Ito, Hekinan (JP); Kenzo Kiyos, Takahama (JP); Eiji Iwanari, Chiryu (JP); Masayuki Kobayashi, Kasugai (JP)"

should be

--(75) Inventors: Kiyonori Moroto Kariya (JP); Motoya Ito, Hekinan (JP); Kenzo Kiyose, Takahama (JP); Eiji Iwanari, Chiryu (JP); Masayuki Kobayashi, Kasugai (JP)--.

Signed and Sealed this

Fourteenth Day of November, 2006

JON W. DUDAS
*Director of the United States Patent and Trademark Office*